US011759742B2

(12) United States Patent
Huang et al.

(10) Patent No.: US 11,759,742 B2
(45) Date of Patent: Sep. 19, 2023

(54) AIR INTAKE FILTER ASSEMBLIES WITH ACTUATABLE FILTER SLATS FOR HEATING, VENTILATION, AND/OR AIR CONDITIONING (HVAC) SYSTEMS

(71) Applicant: Johnson Controls Technology Company, Auburn Hills, MI (US)

(72) Inventors: Zhiwei Huang, Moore, OK (US); Curtis A. Trammell, Norman, OK (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 341 days.

(21) Appl. No.: 16/287,809

(22) Filed: Feb. 27, 2019

(65) Prior Publication Data
US 2020/0254375 A1    Aug. 13, 2020

Related U.S. Application Data

(60) Provisional application No. 62/803,115, filed on Feb. 8, 2019.

(51) Int. Cl.
*B01D 46/42*     (2006.01)
*B01D 46/00*     (2022.01)
(Continued)

(52) U.S. Cl.
CPC ......... *B01D 46/4227* (2013.01); *B01D 46/12* (2013.01); *B01D 46/40* (2013.01);
(Continued)

(58) Field of Classification Search
CPC .............. B01D 46/4227; B01D 46/002; B01D 46/0082; B01D 46/12; B01D 46/40;
(Continued)

(56) References Cited

U.S. PATENT DOCUMENTS 3,839,848 A * 10/1974 Wood .................... B01D 46/10
                                                    55/293
5,766,316 A *  6/1998 Gates .................. B01D 46/0002
                                                    55/504

(Continued)

OTHER PUBLICATIONS

Hughes Environmental, What is the Size of Dust, Jan. 12, 2016, https://hughesenv.com/what-is-the-size-of-dust/, (last visited Mar. 24, 2021) (Year: 2016).*

*Primary Examiner* — Robert A Hopkins
*Assistant Examiner* — Qianping He
(74) *Attorney, Agent, or Firm* — Fletcher Yoder, PC

(57) ABSTRACT

The present disclosure relates generally to air intake filter assemblies, and more particularly to air intake assemblies for an outdoor portion of a heating, ventilation, and/or air conditioning (HVAC) system. In an embodiment, a filter assembly is configured to filter an airflow entering an air intake of a HVAC unit. The filter assembly includes a support structure and a plurality of filter slats, each having a fine filtration material, each disposed within the support structure, and wherein the plurality of filter slats is configured in a louvered relationship and actuated between a closed configuration through which the airflow passes and an open configuration through which the airflow passes.

22 Claims, 15 Drawing Sheets

(51) Int. Cl.
*B01D 46/12* (2022.01)
*B01D 46/40* (2006.01)
*B01D 46/44* (2006.01)
*F24F 13/28* (2006.01)
*F24F 6/12* (2006.01)
*F24F 11/89* (2018.01)
*B01D 46/58* (2022.01)
*B01D 46/79* (2022.01)
*F24F 110/10* (2018.01)

(52) U.S. Cl.
CPC ......... *B01D 46/446* (2013.01); *B01D 46/448* (2013.01); *B01D 46/58* (2022.01); *B01D 46/79* (2022.01); *F24F 6/12* (2013.01); *F24F 11/89* (2018.01); *F24F 13/28* (2013.01); *B01D 2267/30* (2013.01); *B01D 2267/60* (2013.01); *B01D 2273/14* (2013.01); *B01D 2277/20* (2013.01); *B01D 2277/30* (2013.01); *B01D 2279/50* (2013.01); *F24F 2110/10* (2018.01); *F24F 2221/225* (2013.01)

(58) Field of Classification Search
CPC ............................ B01D 46/446; B01D 46/448; B01D 2267/30; B01D 2267/60; B01D 2273/14; B01D 2277/20; B01D 2277/30; B01D 2279/50; B01D 46/125; F24F 11/89; F24F 6/12; F24F 13/28; F24F 2110/10; F24F 2221/225
USPC .... 96/230; 55/315, 328, 393, 400–409, 415, 55/323
See application file for complete search history.

(56) References Cited

U.S. PATENT DOCUMENTS

| | | | |
|---|---|---|---|
| 6,267,665 B1* | 7/2001 | Akhtar | F24F 7/007 454/906 |
| 7,805,953 B2 | 10/2010 | Jensen | |
| 8,915,986 B2 | 12/2014 | O'Leary | |
| 9,746,258 B2 | 8/2017 | O'Keefe | |
| 2005/0211415 A1* | 9/2005 | Arts | F24F 1/04 165/59 |
| 2005/0279347 A1* | 12/2005 | Mejia | B63J 2/04 126/605 |
| 2008/0034776 A1* | 2/2008 | Jensen | F24F 8/10 62/305 |
| 2008/0086981 A1 | 4/2008 | Kilkis et al. | |
| 2008/0295468 A1* | 12/2008 | Ye | G06F 1/206 55/385.6 |
| 2010/0263343 A1* | 10/2010 | Horvat | F02M 35/0203 55/493 |
| 2012/0111190 A1* | 5/2012 | Dariavach | B01D 46/46 96/397 |
| 2012/0272828 A1* | 11/2012 | Dallas | F24F 1/04 165/59 |
| 2015/0082988 A1* | 3/2015 | Butler | B01D 46/0086 96/226 |
| 2015/0251132 A1* | 9/2015 | Tsao | B01D 53/78 96/326 |
| 2016/0003517 A1 | 1/2016 | DeLia | |
| 2016/0258355 A1* | 9/2016 | Zuroski | F02M 35/024 |
| 2016/0317963 A1 | 11/2016 | Williams et al. | |
| 2017/0167742 A1* | 6/2017 | Radovanovic | F24F 11/70 |
| 2017/0368488 A1 | 12/2017 | Wall | |
| 2019/0360721 A1* | 11/2019 | Mislak | F24F 6/12 |
| 2020/0179855 A1* | 6/2020 | Patil | B01D 46/008 |

* cited by examiner

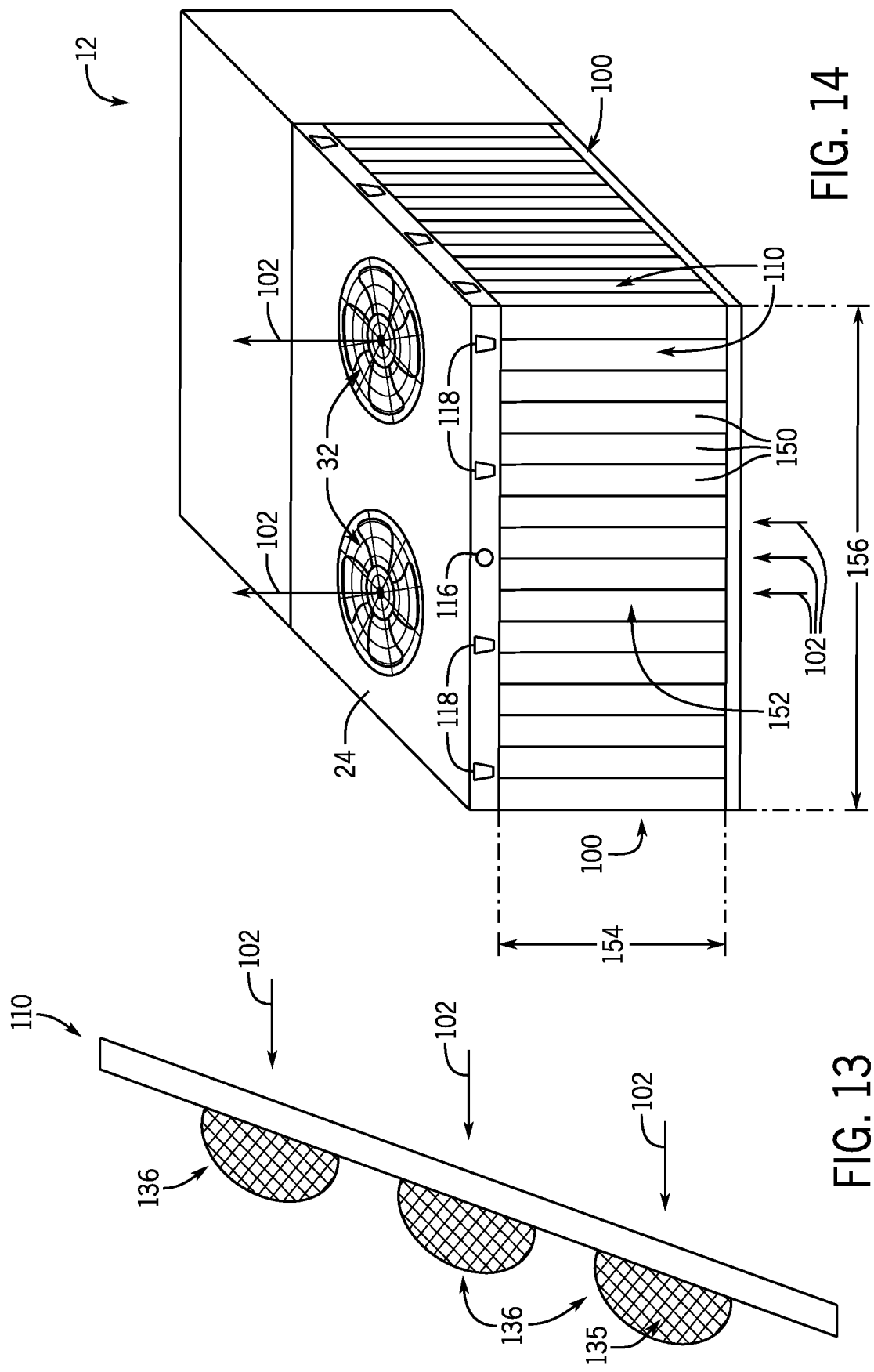

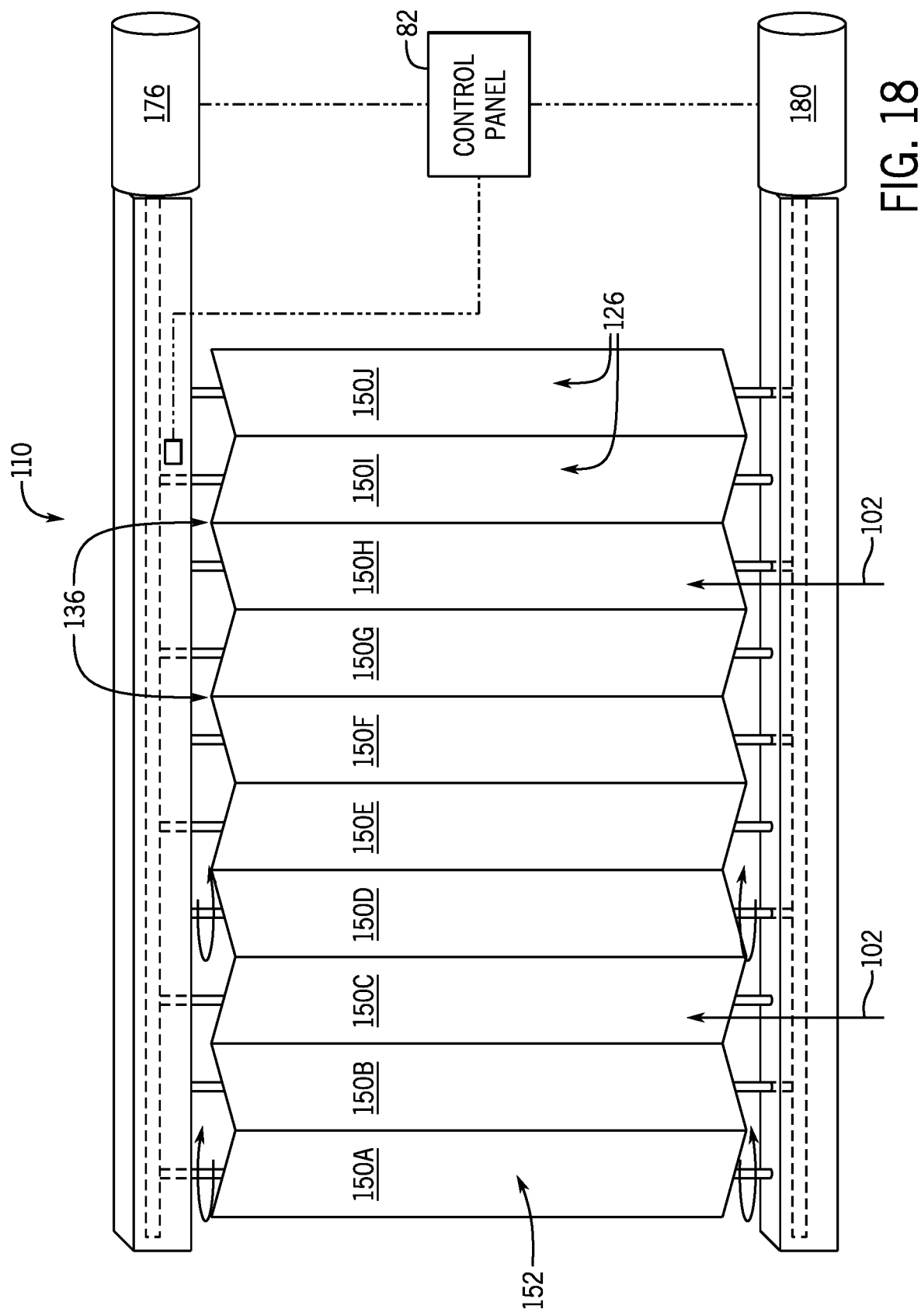

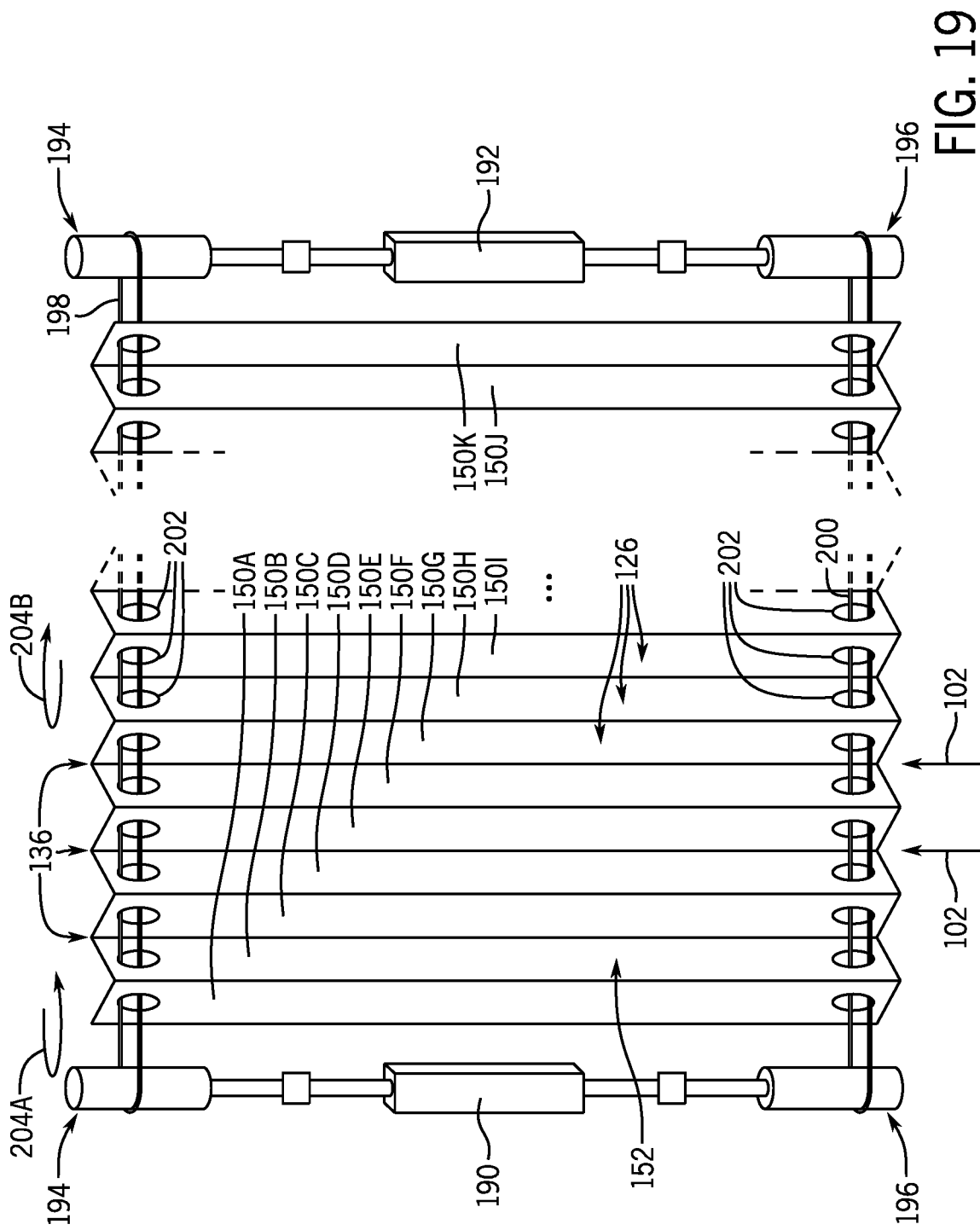

AIR INTAKE FILTER ASSEMBLIES WITH ACTUATABLE FILTER SLATS FOR HEATING, VENTILATION, AND/OR AIR CONDITIONING (HVAC) SYSTEMS

CROSS REFERENCE TO RELATED APPLICATIONS

This application claims priority from and the benefit of U.S. Provisional Application Ser. No. 62/803,115, entitled "AIR INTAKE FILTER ASSEMBLIES WITH ACTUATABLE FILTER SLATS FOR HEATING, VENTILATION, AND/OR AIR CONDITIONING (HVAC) SYSTEMS," filed Feb. 8, 2019, which is herein incorporated by reference in its entirety for all purposes.

BACKGROUND

The present disclosure relates generally to air intake filter assemblies for a heating, ventilation, and/or air conditioning (HVAC) system.

HVAC systems are used to control environmental properties, such as temperature and humidity, within a conditioned space. HVAC systems can include a microchannel heat exchanger, such as a microchannel condenser or evaporator, located in an outdoor portion of the HVAC system. These microchannel heat exchangers are designed to receive and exchange heat with an outdoor airflow during operation of the HVAC system. However, over time, debris from the outdoor environment can accumulate on surfaces of the microchannel heat exchanger. This debris may include, for example, dust and dirt, plant debris, such as leaves, seeds/seed pods, pollen, and grass clippings. As this debris accumulates, it can obstruct air flow through the heat exchanger and interfere with the heat exchange process.

SUMMARY

In an embodiment, a filter assembly is configured to filter an airflow entering an air intake of a heating, ventilation, and/or air conditioning (HVAC) unit. The filter assembly includes a support structure and a plurality of filter slats, each comprising a fine filtration material, each disposed within the support structure. The plurality of filter slats is configured in a louvered relationship and actuated between a closed configuration through which the airflow passes and an open configuration through which the airflow passes.

In an embodiment, a filter assembly is configured to selectively filter debris from an airflow entering an air intake of a heating, ventilation, and/or air conditioning (HVAC) unit. The filter assembly includes: a motor; a transfer device operably coupled to the motor; and a plurality of filter slats in louvered relationship, each comprising a fine filtration material, each operably coupled to the motor via the transfer device, and configured to be selectively actuated between a closed configuration and an open configuration.

In an embodiment, a heating, ventilation, and/or air conditioning (HVAC) unit including: a control panel configured to control operation of the HVAC unit, and filter assembly configured to filter debris from an airflow entering an air intake of the HVAC unit to exchange heat with a heat exchanger of the HVAC unit. The filter assembly includes: a motor communicatively coupled to the control panel; a transfer device operably coupled to the motor; and a plurality of filter slats, each comprising a fine filtration material, each operably coupled to the transfer device in a louvered relationship, and configured to be actuated between a closed configuration and an open configuration.

BRIEF DESCRIPTION OF THE DRAWINGS

FIG. 13 is a side view of another embodiment of the filter assembly, in accordance with an aspect of the present disclosure;

FIG. 14 a perspective view of another embodiment of the HVAC unit of FIGS. 2 and 5, wherein the HVAC unit includes an embodiment of the filter assembly having movable filter sections, in accordance with an aspect of the present disclosure;

FIG. 18 is a schematic diagram illustrating the embodiment of the filter assembly illustrated in FIG. 17 in a closed configuration, in accordance with an aspect of the present disclosure; and FIG. 19 is a schematic diagram illustrating another embodiment of the filter assembly in a closed configuration, in accordance with an aspect of the present disclosure.

DETAILED DESCRIPTION

Figure 1:
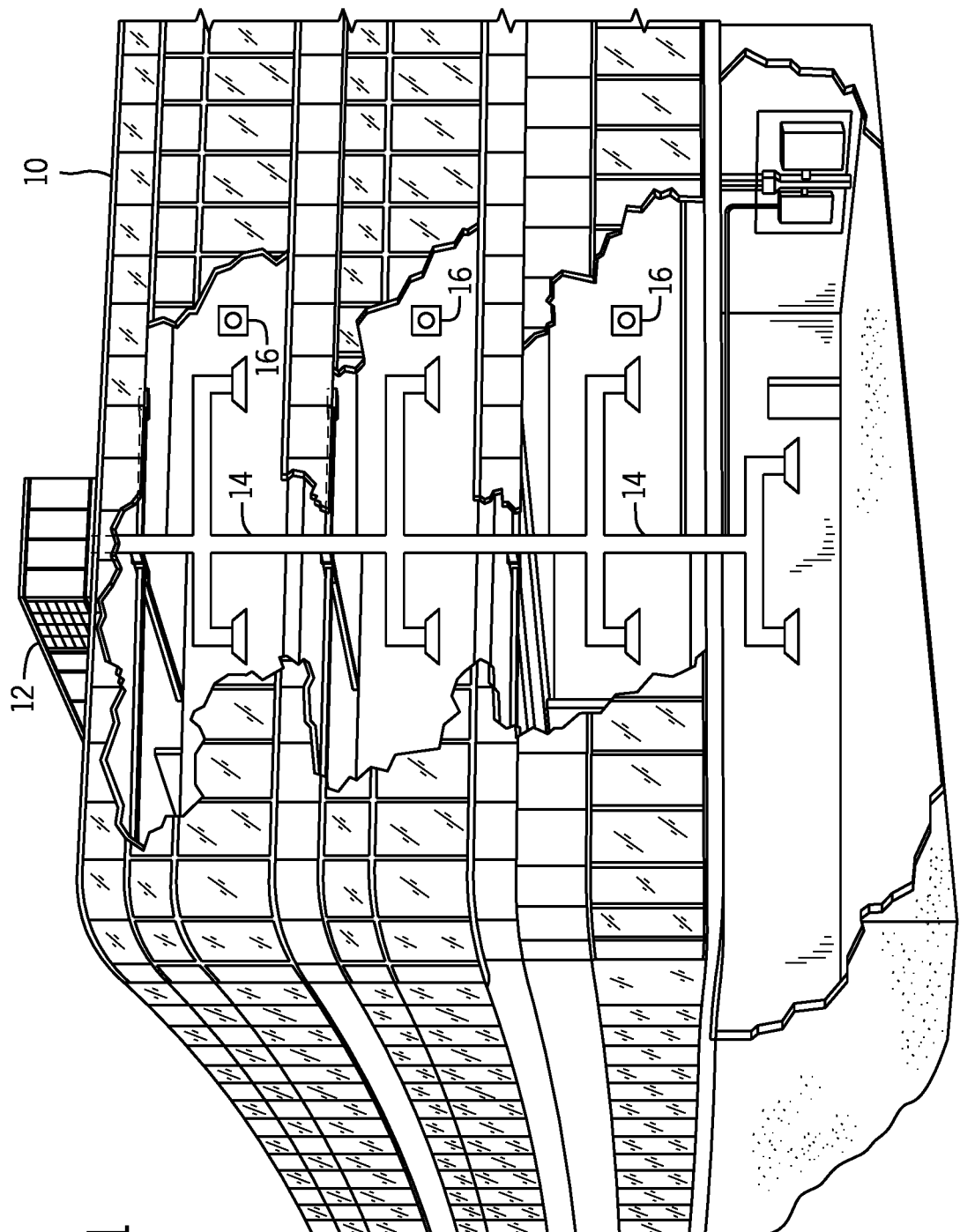
FIG. 1 is a perspective view of an embodiment of a commercial or industrial HVAC system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As set forth above, HVAC systems typically include at least one microchannel heat exchanger that is designed to exchange heat with an air volume that is separate from a conditioned air volume. As such, these microchannel heat exchangers are generally disposed in an outdoor portion of the HVAC system and are designed to receive a flow of outdoor air across the heat exchanger. As mentioned, debris from the outdoor environment can accumulate on surfaces of the microchannel heat exchanger, which can result in reducing air flow through the heat exchanger and the efficiency of the heat exchange process. It is presently recognized that it would be desirable to filter this debris from the outdoor air flow to block it from collecting on the surfaces of the microchannel heat exchanger. However, it is presently recognized that adding a filter in the flow path of the condenser creates a pressure drop in the flow path. As a result, the fan of the HVAC unit generally moves less outdoor air along the flow path when a filter is present relative to operation without the filter present. Furthermore, it is presently recognized that this pressure drop continues to increase over time as the filter accumulates debris that blocks airflow through the filter.

Additionally, as mentioned, outdoor debris may include, for example, dust and dirt, plant debris, such as leaves, seeds/seed pods, pollen, and grass clippings. It is presently recognized that the presence of at least a portion of this debris can be predicted in a temporal manner. For example, certain types of plant debris may occur during a particular season or time of year and/or time of day based on the behavior of regional plant flora and/or landscaping activities. By way of particular example, certain plants may produce pollen and/or seeds/seedpods in particular times or seasons of the year. Additionally, in certain regions, dust levels may also predictably increase or decrease at particular times of the year or the day. Furthermore, it is recognized that certain debris can be grouped by size. For example, debris (e.g., dust and pollen) having a size that is less than about 1 mm (±10%) is designated herein as fine debris, while certain debris (e.g., seed pods, grass clippings) having a size that is greater than about 1 mm (±10%) is designated herein as coarse debris.

With the foregoing in mind, present embodiments are directed toward a filter assembly for an air intake of a HVAC system that is designed to remove debris from an airflow. More specifically, present embodiments include filter assemblies that are designed to be disposed upstream of a microchannel heat exchanger of an HVAC unit to capture debris and prevent it from depositing onto a surface of the heat exchanger. In certain embodiments, the disclosed filter assembly includes inner and outer coarse filters with a fine filter removably loaded therebetween. For such embodiments, the replaceable fine filter includes multiple levels with respect to the airflow, including an upper level and a lower level, wherein the lower level includes features (e.g., valleys, extensions) that extend in the direction of air flow and that accumulate captured debris while still enabling suitable airflow through the filter assembly, limiting the pressure drop across the filter assembly. In other embodiments, the filter assembly includes a set of movable filter sections, such as filter blades or slats in a louvered arrangement, which can be selectively positioned and moved between an open configuration and a closed configuration that blocks both coarse and fine debris from traversing the outdoor air intake. Further, by adjusting the positions of the filter sections to provide a minimum amount of filtration that is suitable for a given environment and time, such embodiments minimize the pressure drop associated with the filter assembly. Accordingly, the disclosed filter assemblies improve the efficiency and the operation of the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
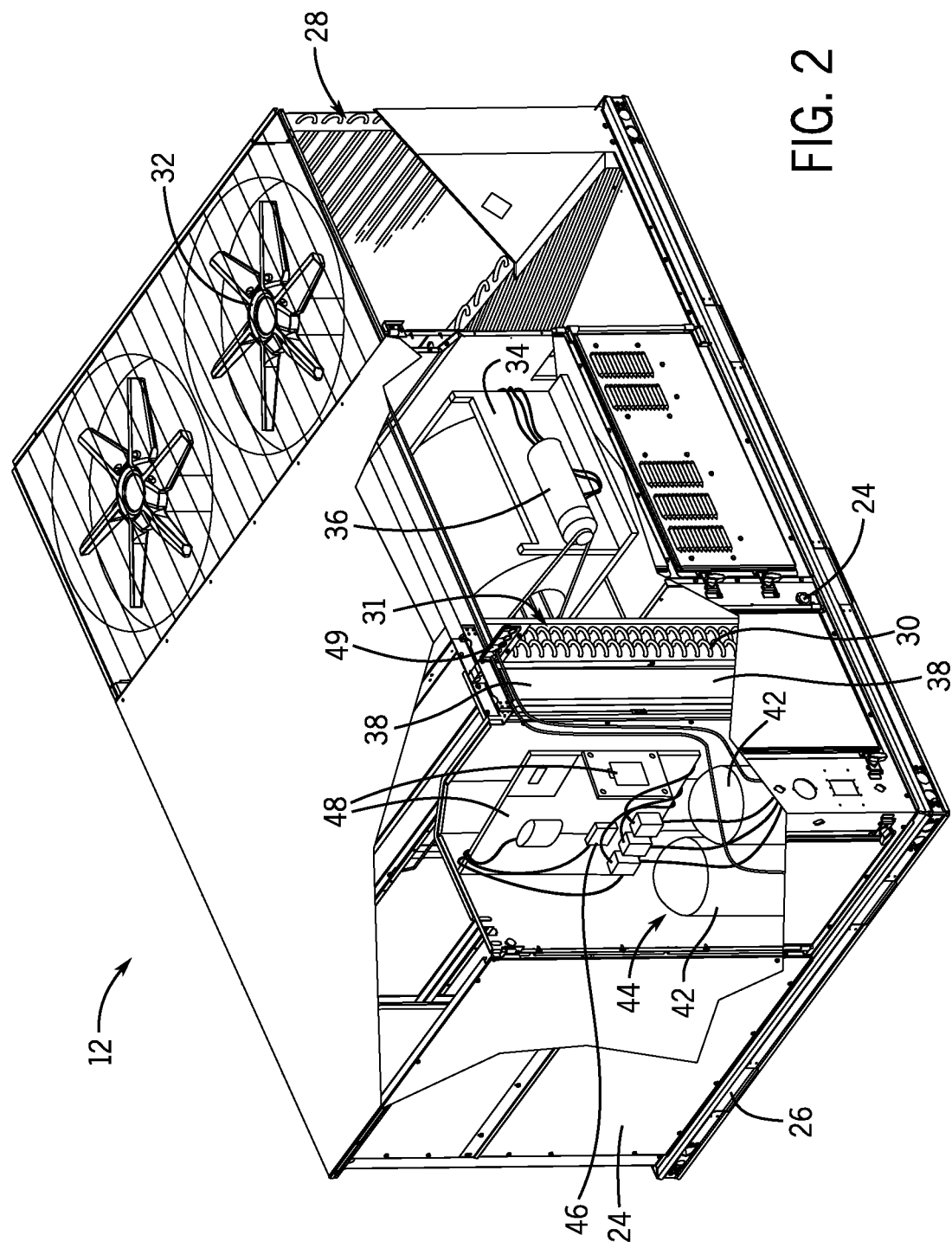
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
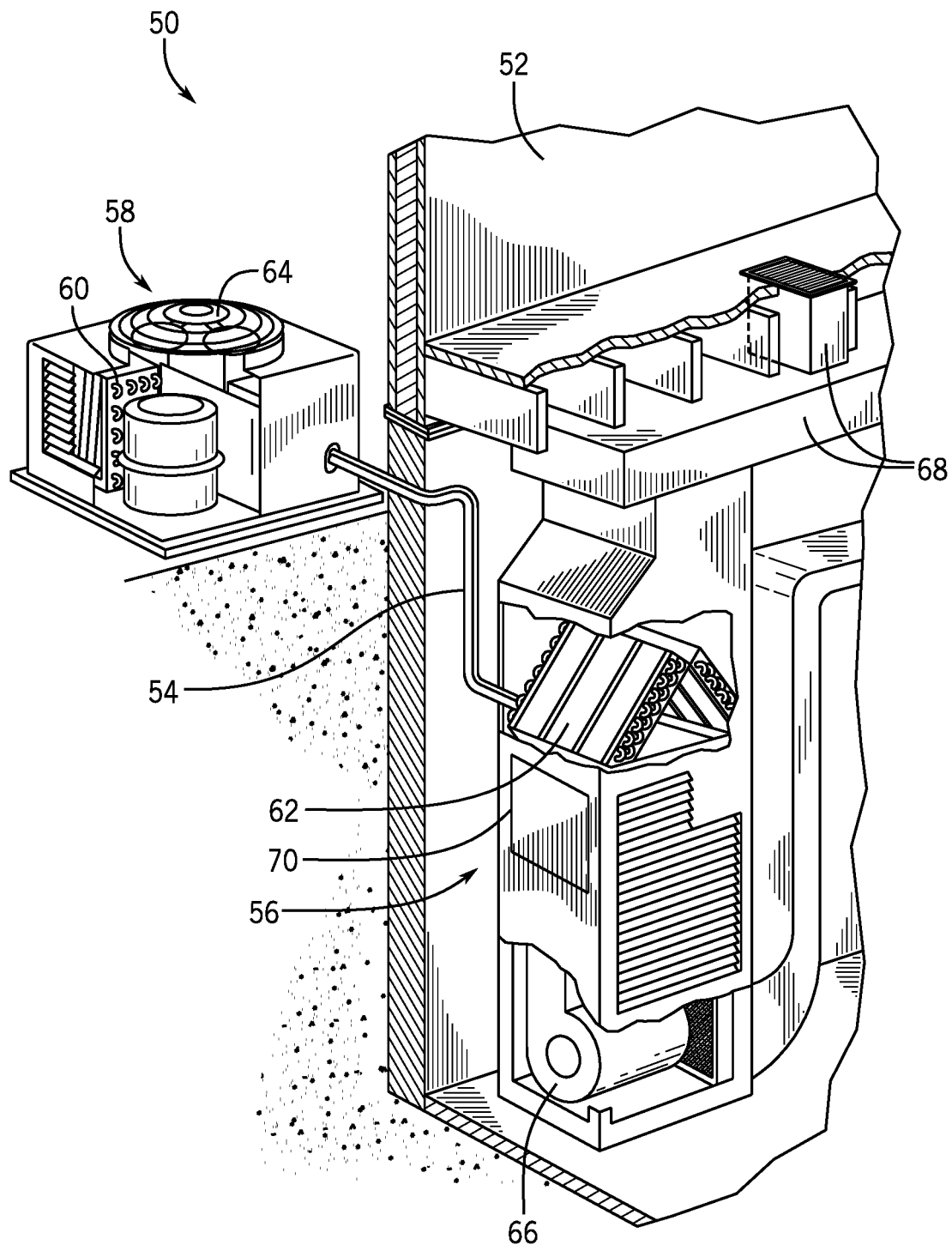
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
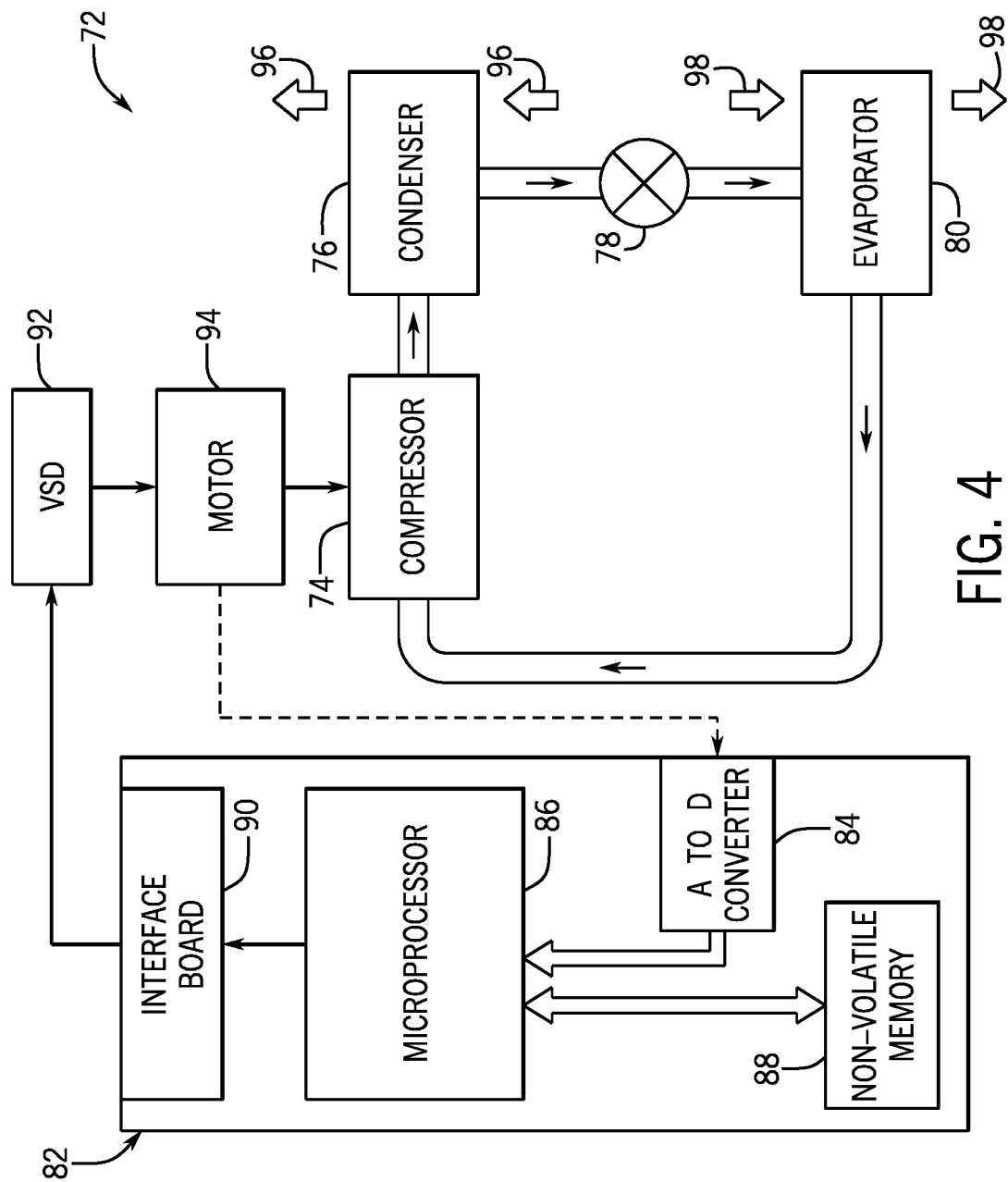
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth. As discussed below, in certain embodiments, the control panel 82 may include a clock that tracks a current time and date, and the non-volatile memory 88 may store information, such as predetermined or predefined threshold values, target values, or information about periods of time when debris is known or expected to increase in the outdoor environment.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications that include an outdoor air intake.

Figure 5:
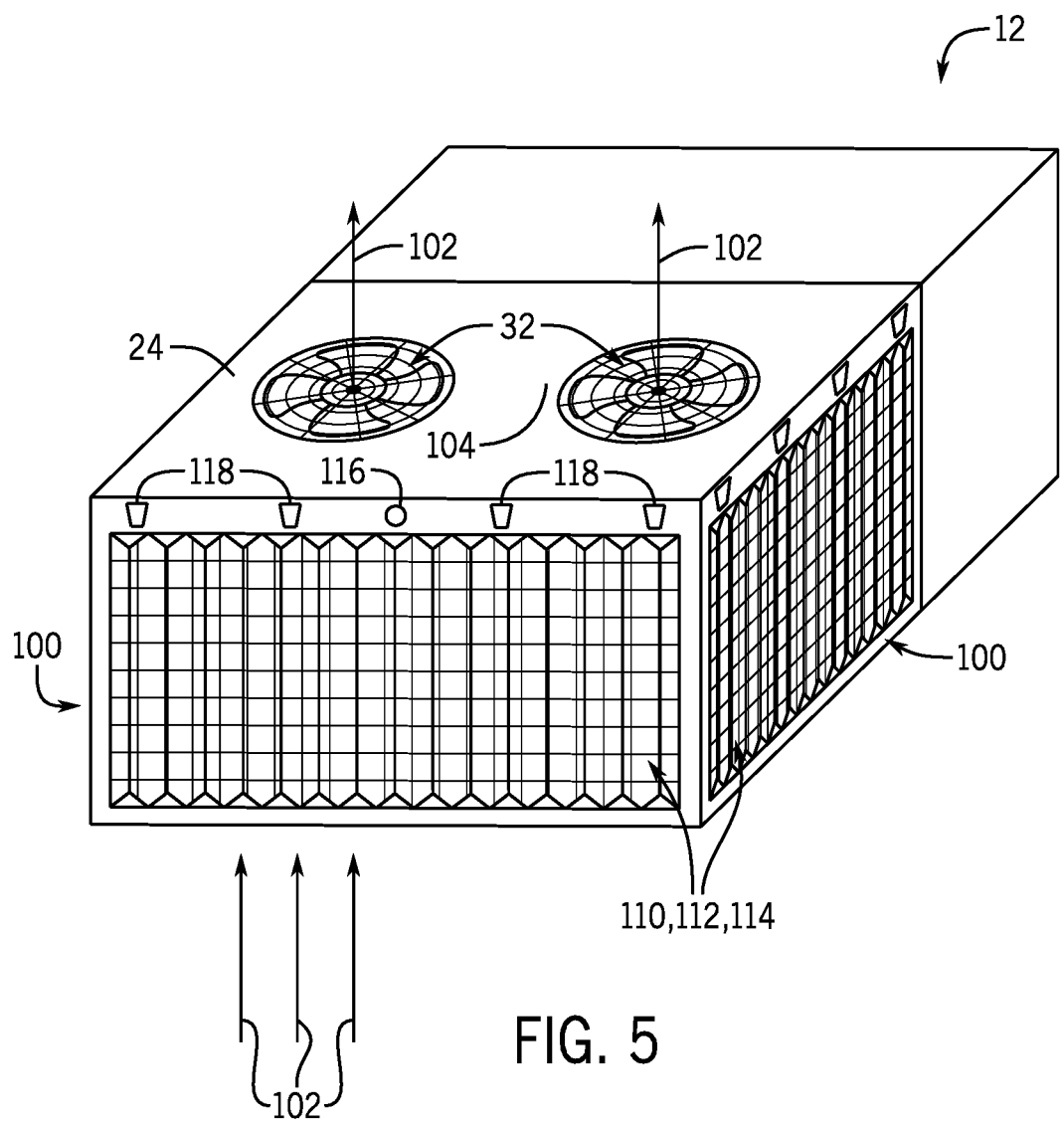
FIG. 5 is a perspective view of another embodiment of the HVAC unit of FIG. 2, in accordance with an aspect of the present disclosure.

FIG. 5 is another perspective view of an embodiment of the HVAC unit 12 of FIG. 2. In the illustrated embodiment, the HVAC unit 12 is a single package unit, such as a roof-top HVAC unit. In other embodiments, the HVAC unit 12 may be the outdoor HVAC unit 58 of a residential HVAC system. With this in mind, the HVAC unit 12 illustrated in FIG. 5 includes at least one outdoor air intake 100 that is disposed near the heat exchanger 28, as discussed above with respect to FIG. 2. During operation, the fans 32 draw an airflow 102 from the environment through the air intake 100 and through the heat exchanger 28 before driving the airflow 102 through air exhausts 104 associated with the fans 32. In certain embodiments, the HVAC unit 12 may include multiple air intakes 100 on different sides or faces of the unit.

For the HVAC unit 12 of FIG. 5, each outdoor air intake 100 of the unit includes a filter assembly 110 that blocks or prevents certain debris from entering the unit. As discussed in detail below, each filter assembly 110 of the illustrated embodiment includes a coarse outer mesh 112, or another suitable coarse filter, that is designed to block coarse debris from entering the HVAC unit 12 and at least one fine filter 114 disposed behind the coarse outer mesh 112 (downstream with respect to the airflow 102) that is designed to block fine debris from entering the HVAC unit 12. Moreover, as illustrated below, for certain embodiments of the filter assembly 110, the fine filter 114 includes features (e.g., ridges, extensions, protrusions) that extend in the direction of the airflow 102 and that accumulate fine debris in a manner that limits the pressure drop across the filter assembly 110 during operation of the HVAC unit 12.

The embodiment of the HVAC unit 12 illustrated in FIG. 5 includes at least one pressure sensor 116 that is communicatively coupled to the control panel 82 and that is designed to measure the pressure drop across the filter assembly 110 during operation of the unit. For example, in certain embodiments, the HVAC unit 12 includes a single differential pressure sensor 116 capable of measuring a difference in pressure between the outside of the cabinet 24 of the HVAC unit 12 (e.g., on the outside of the filter assembly 110) and the inside of the cabinet 24 (e.g., on the inside of the filter assembly 110, near the heat exchanger 28). In other embodiments, the HVAC 12 may include separate pressure sensors that are arranged to collect separate pressure measurements on either side of the filter assembly 110, and the control panel 82 may calculate the pressure drop based on the difference between the two pressure measurements. Additionally, in certain embodiments, the HVAC unit 12 may include any other suitable sensors, including temperature sensors, flow sensors, humidity sensors, and so forth, in accordance with the present disclosure.

Additionally, the embodiment of the HVAC unit 12 illustrated in FIG. 5 also includes a number of water spray jets 118 that are disposed above each air intake 100 of the HVAC unit 12. These water spray jets 118 are coupled to a water source, such as a water supply pipe of the building 10 that is conditioned by the HVAC unit 12 or a reservoir that collects condensation from the evaporator heat exchanger 30 of the HVAC unit 12 during operation, and include electronically controlled valves that are communicatively coupled to the control panel 82 of the HVAC unit 12. For the illustrated embodiment, it may be appreciated that the water spray jets 118 can serve multiple purposes during operation of the HVAC unit 12. As discussed, the water spray jets 118 may be activated to provide cooling and/or cleaning benefits to the filter assembly 110. As such, the control panel 82 of the HVAC unit 12 may activate the water spray jets 118 at different times, such as when the fans 32 are active or inactive, to provide these benefits. In certain embodiments, the control panel 82 may activate the water spray jets 118 according to a predefined schedule, such as once per day, once per week, every morning, or every evening. In other embodiments, the control panel 82 may selectively activate the water spray jets 118 in response to particular set of predefined conditions. For example, the control panel 82 may selectively activate the water spray jets 118 in response to determining that the measured pressure drop across the filter assembly 110 has increased above a predefined pressure threshold value, in response to determining that the outdoor air temperature has exceeded a predefined temperature threshold value.

For example, as the water spray jets 118 release a spray of water when the fans 32 are active, the airflow 102 drives droplets of water into the filter assembly 110. As such, the filter assembly 100 acts like a cooling pad as heat from the airflow is absorbed by these water droplets and the droplets evaporate from the filter assembly 110 to form water vapor within the airflow 102, cooling the airflow 102 before it reaches the heat exchanger 28, thereby enabling the airflow 102 to remove a greater amount of heat from the heat exchanger 28. This cooling effect results in a reduction of discharge temperature, and thus a reduction in the power consumption of the compressor 42 of the HVAC unit 12 during operation. Additionally, it is presently recognized that the water spray jets 118 can also be designed to provide a downward spray of water across the coarse outer mesh 112 and/or the fine filter 114 of the filter assembly 110 to wash or flush debris from the filter assembly 110. For example, in certain embodiments, the control panel 82 may activate the water spray jets 118 during a portion of the operation of the HVAC unit 12 in which the fans 32 are not active, and may provide a sufficient flow of water to dislodge coarse debris from the surface of the coarse outer mesh 112 and/or fine debris from the surface of the fine filter 114 before reactivation of the fans 32. It may be appreciated that washing the filter assembly 110 in this manner reduces the pressure drop across the filter assembly 110 relative to the filter assembly 110 that has accumulated debris. Also, after washing, the filter assembly 110 will initially be wet, which can provide the cooling effect described above once the fans 32 are reactivated.

Figure 6:
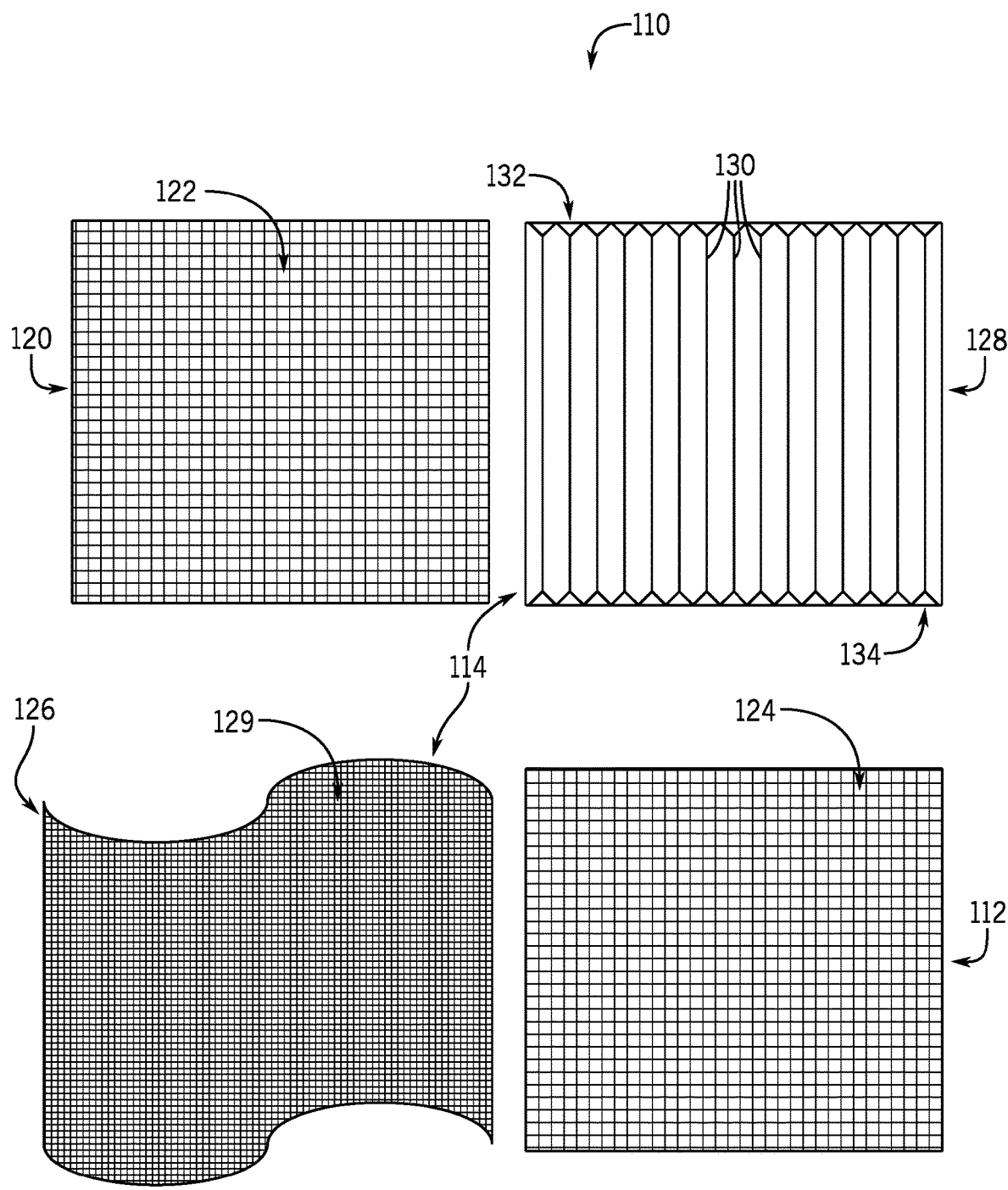
FIG. 6 is an exploded diagrammatic view of an embodiment of the filter assembly, in accordance with an aspect of the present disclosure.

FIG. 6 is an exploded view of an embodiment of the filter assembly 110. For the illustrated embodiment, the filter assembly 110 includes the coarse outer mesh 112 and a coarse inner mesh 120, which may be made of metal or another suitable structural material, such as a polymer. The outer mesh 112 is disposed on an outer side of the filter assembly 110, upstream of the other components of the filter assembly 110 with respect to the airflow 102, while the coarse inner mesh 120 is disposed on an inner side of the filter assembly, nearest the heat exchanger 28. As such, the respective openings 122 and 124 of the inner mesh 120 and the outer mesh 112 have dimensions that are generally have a size of 1 mm or more, and therefore, are sized to block the passage of coarse debris from traversing the air intake 100. However, it may be appreciated that, in certain embodiments, the openings 122 of the inner mesh 120 may be substantially (e.g., 2×, 3×, 5×) larger than the openings 124 of the outer mesh 112 since the outer mesh 112 provides initial coarse filtration. In certain embodiments, the inner mesh 120 may be integrated into the cabinet 24 of the HVAC unit 12 or mounted over the air intake 100. In still further embodiments, the inner and/or outer meshes 120 and 112 may be implemented as perforated plates having openings 122 and 124, respectively.

The embodiment of the filter assembly 110 illustrated in FIG. 6 includes a fine filter 114 having a filtration material 126 and a filter frame or support 128. The filtration material 126 is generally a fine filtration material capable of blocking fine debris from traversing the air intake 100 of the HVAC unit 12. In certain embodiments, the filtration material 126 may be a flexible, fiber-based filtration medium, such as a fiber glass or a woven fabric filtration medium that includes airflow passages 129 smaller than 1 mm. As such, in certain embodiments, the filtration material 126 is both removable and replaceable with respect to the filter assembly 110. The filter support 128 may be made of metal or another suitable structural material. Additionally, the illustrated filter support 128 includes a number of support rods 130 that extend between an upper portion 132 and a lower portion 134 of the filter support 128 that are designed to support the filtration material 126. For the illustrated embodiment, the filtration material 126 is woven through the support rods 130 such that the resulting fine filter 114 has a three-dimensional shape, including valleys or extensions of various shapes and sizes, as discussed below. In some embodiments, the filter support 128 and the fine filter 114 are integral. For example, a rigid material may be utilized and formed into the desired shape.

Figure 7:
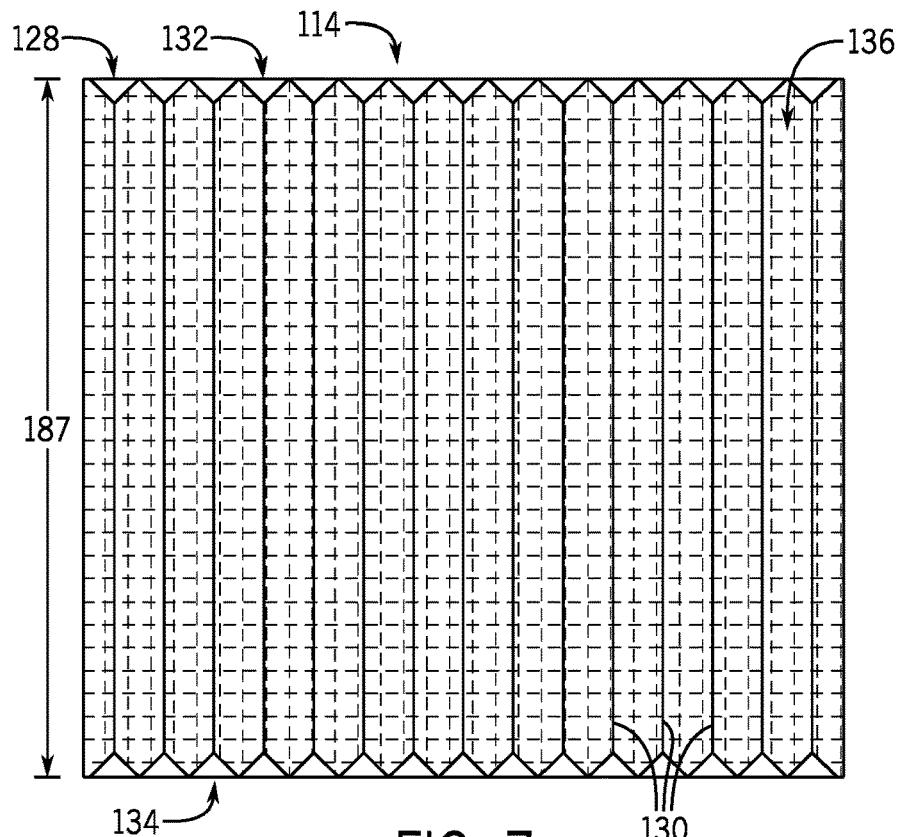
FIG. 7 is a perspective view of an embodiment of a fine filter for the filter assembly of FIG. 6, in accordance with an aspect of the present disclosure.
Figure 8:
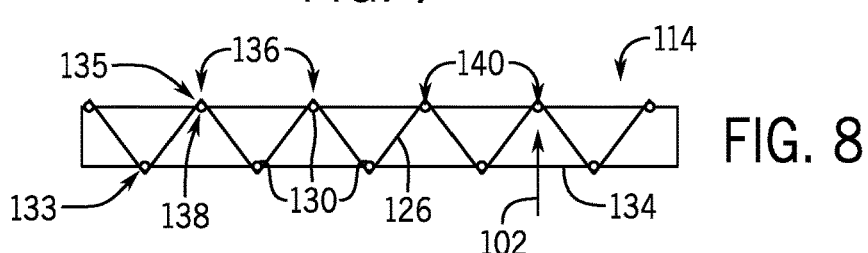
FIG. 8 is a top-down cross-sectional view of an embodiment of a fine filter for the filter assembly of FIG. 6, in accordance with an aspect of the present disclosure.

FIG. 7 is a perspective view and FIG. 8 is a top-down cross-sectional view of an embodiment of the fine filter 114 of the filter assembly of FIG. 6. The illustrated fine filter 114 includes the filtration material 126 loaded into the filter support 128. As such, the fine filter 114 has a three dimensional shape that limits blockage of the airflow 102 as a result of captured fine debris. For the illustrated embodiment, the fine filter 114 may be described as a multilevel filter having a first or upper level 133 and a second or lower level 135. More specifically, the lower level 135 of the fine filter 114 includes triangular valleys 136 that that extend or protrude in the direction of the airflow 102, giving the fine filter 114 a zig-zag or accordion-like profile, as best illustrated in FIG. 8. The illustrated triangular valleys 136 may also be described as stretching or extending across a substantial portion of the lengths 137 of the filter assembly. As fine debris 138 is removed from the airflow 102 and accumulates in the fine filter 114, it is gradually driven toward the base 140 of these triangular valleys 136, which leaves a greater portion of the filtration material 126 unobstructed by debris, reducing the pressure drop across the filter assembly 110 as a result of the debris.

For the embodiment illustrated in FIGS. 6-8, the filter assembly 110 may be installed on the air intake 100 and used in different configurations. For example, in a first configuration, the coarse inner mesh 120 is affixed to the air intake 100 and filters coarse debris from the airflow 102, while the coarse outer mesh 112 and the fine filter 114 are not used. Then, during periods of increased debris, the fine filter 114 and the coarse outer mesh 112 may be removably affixed to the air intake 100, over the coarse inner mesh 120, in a second configuration that filters both coarse debris and fine debris from the airflow 102. The filtration material 126 of the fine filter 114 can be replaced by removing the coarse outer mesh 112, removing the filtration material 126 from the filter support 128, loading new filtration material 126 into the filter support 128, and replacing the fine filter 114 between the coarse meshes 112, 120. In a third configuration, the fine filter 114 is disposed over the coarse inner mesh 120 without the coarse outer mesh 112, which obviates removal of the coarse outer mesh 112 during replacement of the filtration material 126 of the fine filter 114.

Figure 9:
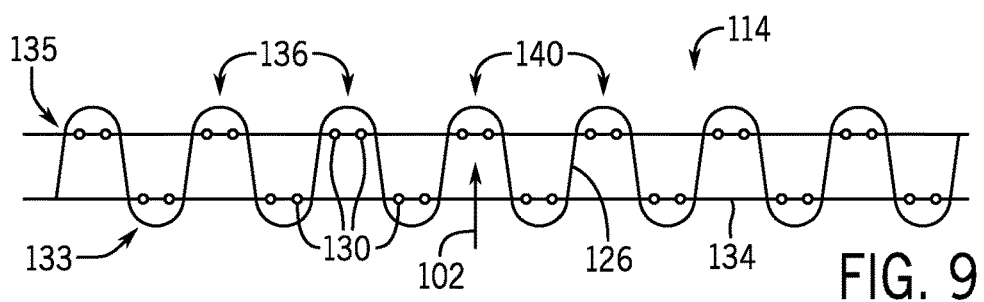
FIG. 9 illustrates a top-down cross-sectional view of another embodiment of a fine filter for the filter assembly, in accordance with an aspect of the present disclosure.
Figure 10:
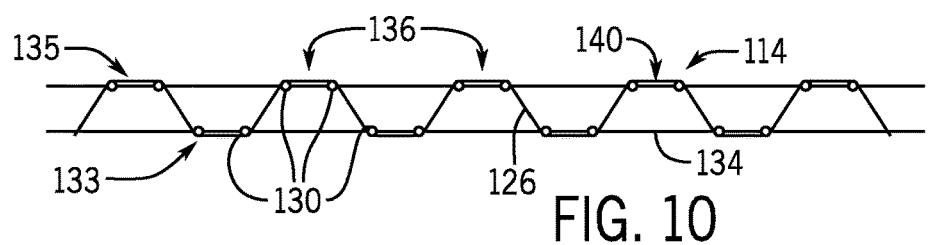
FIG. 10 illustrates a top-down cross-sectional view of another embodiment of a fine filter for the filter assembly, in accordance with an aspect of the present disclosure.

It may be appreciated that fine filter 114 of the disclosed filter assembly 110 is not limited to triangular valleys 136. For example, FIGS. 9 and 10 illustrate top-down cross sectional views of other designs for the fine filter 114 that have different cross-sectional shapes for different embodiments of the filter assembly 110. In particular, the fine filter 114 illustrated in FIG. 9 includes the filtration material 126 woven through the support rods 130 of a filter support 128, such that the lower level 135 of the fine filter 114 includes rounded or undulating valleys 136 that extend or protrude in the direction of the airflow 102. Unlike the fine filter 114 illustrated in FIG. 8, the embodiment of the fine filter 114 illustrated in FIG. 9 lacks support rods 130 disposed at the base 140 of the valleys. Rather, the filtration material 126 is draped over multiple support rods 130 to form each undulating valley 136, such that the base 140 of each valley remains unobstructed by a support rod 130. The lower level 135 of the fine filter illustrated in FIG. 10 instead includes trapezoidal valleys 136 that extend or protrude in the direction of the airflow 102. Similar to the fine filter 114 of FIG. 9, for the embodiment of the fine filter 114 illustrated in FIG. 10, the filtration material 126 is draped over multiple support rods 130 to form each trapezoidal valley 136, such that the base 140 of each valley remains unobstructed by a support rod 130.

Figure 11:
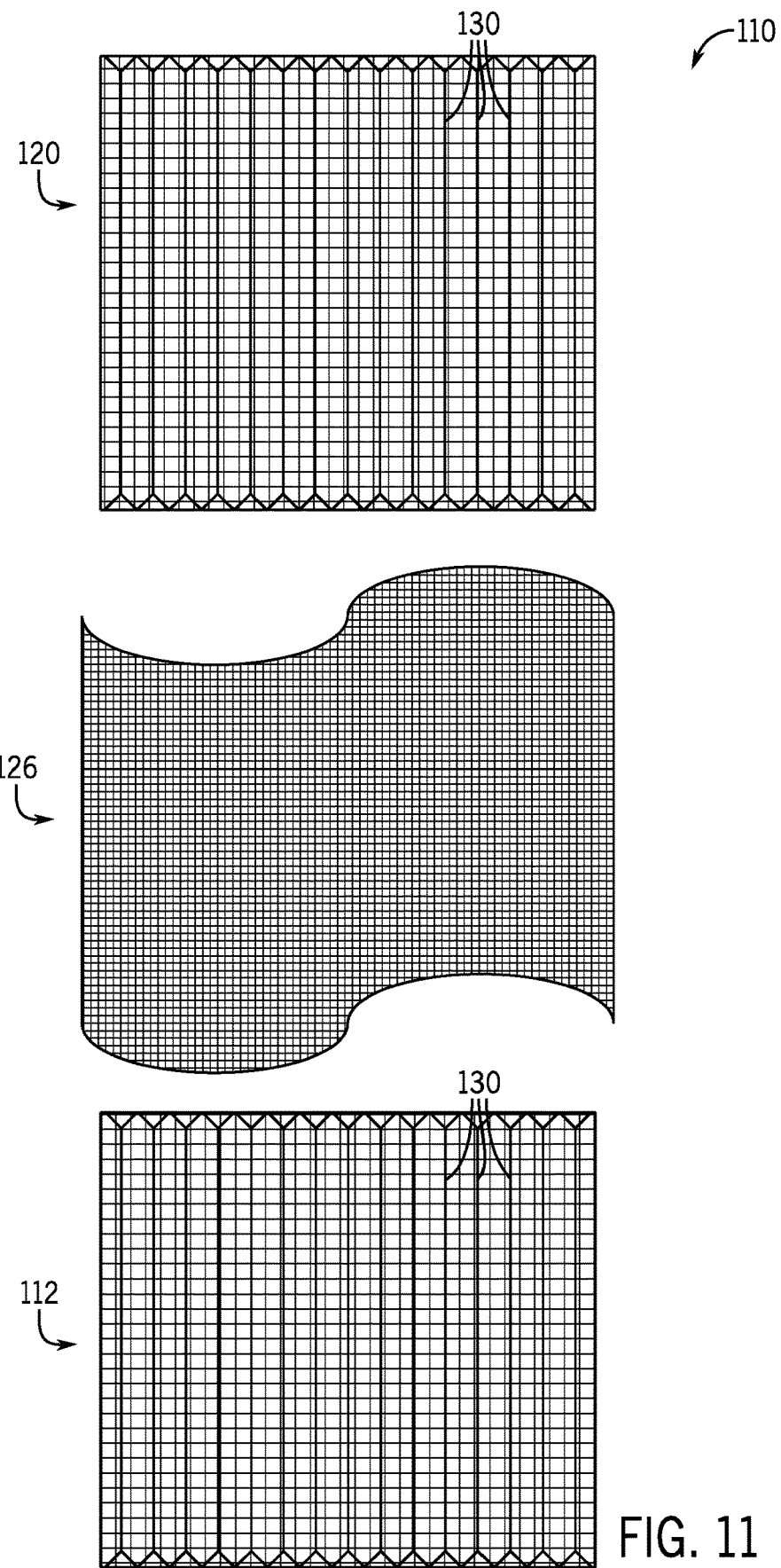
FIG. 11 is an exploded view of another embodiment of the filter assembly, in accordance with an aspect of the present disclosure.

FIG. 11 is an exploded view of another embodiment of the filter assembly 110. For the illustrated embodiment, the filter assembly 110 includes a coarse outer mesh 112, a coarse inner mesh 120, and a filtration material 126, as discussed above. However, the illustrated embodiment lacks the separate filter support 128 illustrated in FIG. 6. Instead, for the embodiment of the filter assembly 110 illustrated in FIG. 11, the outer mesh 112 and the inner mesh 120 include support rods 130 that are designed to secure the filtration material 126 in place. Like the embodiment of FIG. 6, the filter assembly 110 of FIG. 11 is formed by weaving the filtration material 126 through the support rods 130, such that the filtration material 126 forms a multi-level fine filter including the triangular valleys 136, as discussed above. In certain embodiments, the support rods 130 may be disposed on only one of the outer mesh 112 or the inner mesh 120. For example, in certain embodiments, the support rods 130 may be disposed only on the outer mesh 112 to enable a service technician to easily remove and replace the filtration material 126 and/or the outer mesh 112, while leaving the inner mesh 120 affixed to the air intake 100 of the HVAC unit 12.

Figure 12:
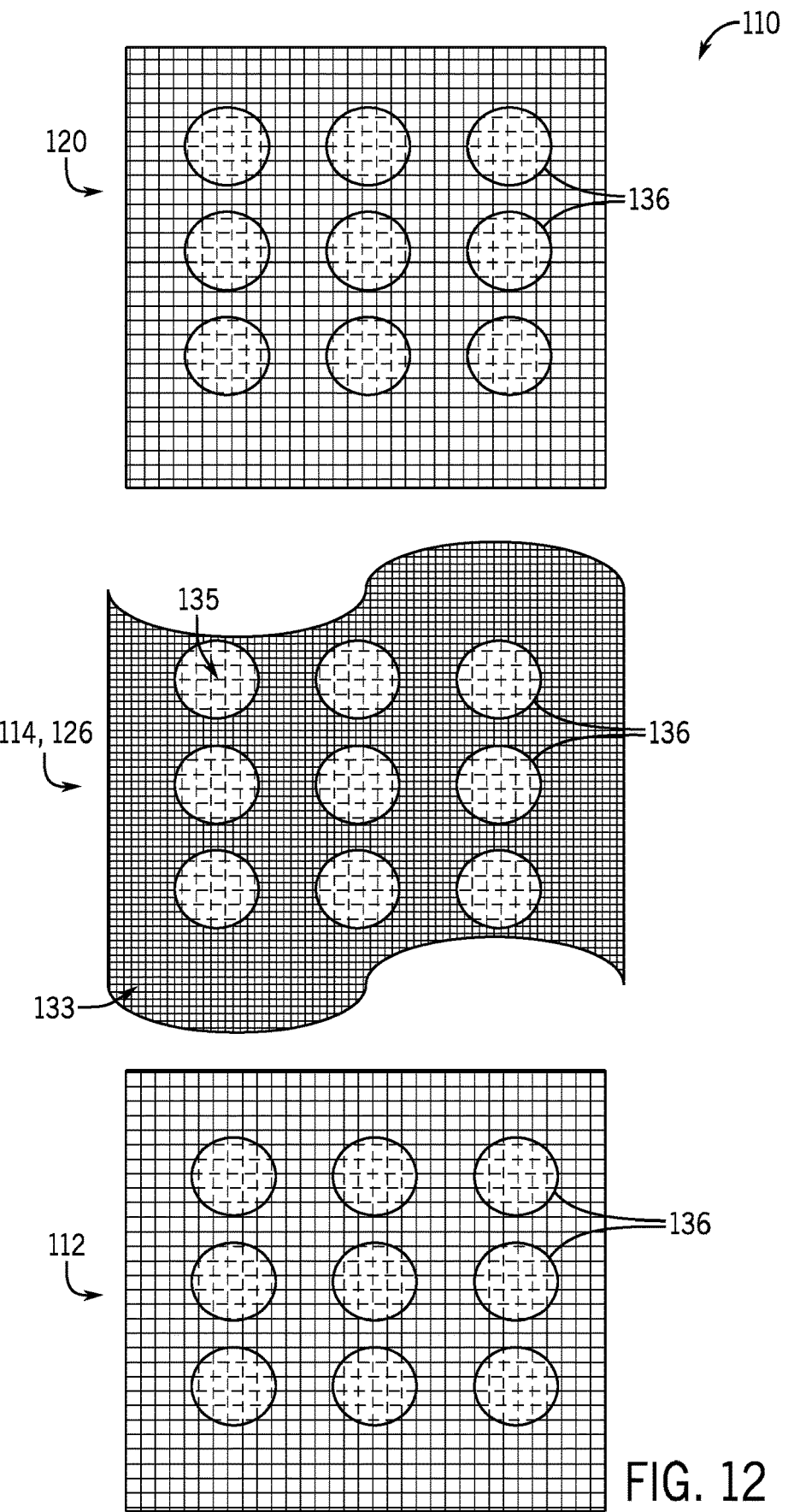
FIG. 12 is an exploded view of another embodiment of the filter assembly, in accordance with an aspect of the present disclosure.

FIG. 12 is an exploded view and FIG. 13 is a side view of another embodiment of the filter assembly 110. Like the filter assemblies discussed above, the embodiment of the filter assembly 110 illustrated in FIG. 12 includes a set of rounded extensions 136 (e.g., concave or convex extensions) that protrude in the direction of the airflow 102. While the illustrated rounded extensions are illustrated as being relatively large (e.g., tens of centimeters in diameter), in other embodiments, these extensions may be relatively small (e.g., a few millimeters in diameter) dimple-like extensions. For the illustrated embodiment, each of the inner mesh 120, the outer mesh 112, and the filtration material 126 include the rounded extensions 136. As such, the fine filter 114 may be described as having a first or upper level 133 that corresponds to the planar portion of the filter, and having a second or lower level 135 that includes the rounded extensions 136. In other embodiments, the inner mesh 120 may not include rounded extensions 136, increasing the distance between planar portions of the inner mesh 120 and outer mesh 112 in the filter assembly 110. Additionally, in certain embodiments, the filtration material 126 may initially be substantially flat and lack the rounded extensions, and may acquire the rounded extensions upon being loaded between the inner and outer meshes 120 and 112. In other embodiments, the extensions 136 may have an ovular cross-section. Additionally, rather than being arranged in rows and columns, in other embodiments, the extensions 136 may be staggered to enable a greater number or a tighter packing of the rounded extensions 136 on the surface of the fine filter 114. In still other embodiments, the filtration material 126 may have sufficient structural rigidity to maintain its shape (e.g., including the rounded extensions 136) without the inner mesh 120 and/or outer mesh 112 being present, and the filtration material 126 effectively filters both coarse and fine debris from entering the HVAC unit 12. For example, in certain embodiments, the filtration material 126 may be used in combination with only the inner mesh 120, in combination with only the outer mesh 112, or without the inner mesh 120 or outer mesh 112.

FIG. 14 is a perspective view of another embodiment of the HVAC unit 12 of FIGS. 2 and 5. The illustrated HVAC unit 12 is a single package unit, such as a roof-top HVAC unit, or may be the outdoor HVAC unit 58 of a residential HVAC system. The HVAC unit 12 illustrated in FIG. 14 includes a number of features discussed above with respect to FIGS. 2 and 5, including the cabinet 24, heat exchanger 28 (not shown), air intakes 100, fans 32, pressure sensor 116, and water spray jets 118. For the HVAC unit 12 of FIG. 14, another embodiment of the filter assembly 110 is disposed over each air intake 100 of the unit to block or prevent certain debris from entering the unit. As discussed in detail below, each filter assembly 110 of the illustrated embodiment includes a number of filter sections 150, also referred to herein as filter blades or filter slats, at least a portion of which are movable, such that the filter sections 150 can be adjusted into different configurations to selectively block or filter coarse debris, fine debris, or a combination thereof, from traversing the air intake 100, and to minimize the pressure drop across the filter assembly 110. As such, the filter slats 150 may be described as being in a louvered relationship with respect to one another. For the illustrated embodiment, each filter assembly 110 is in a closed position, in which adjacent filter slats 150 contact one another to form a unified or continuous filter surface 152 that is designed to block both coarse and fine debris from traversing the air intake 100. It may be noted that, while the filter slats 150 of each filter assembly 110 illustrated in FIG. 14 extend vertically across a substantial portion of the height 154 of the air intake 100, in other embodiments, the filter slats 150 may instead extend horizontally across a substantial portion of the width 156 of the air intake 100. It may be appreciated that the filter assembly 110 illustrated in FIG. 14 offers an advantage in that certain embodiments of the filter assembly 110 are designed to selectively adjust to provide different levels of filtering without being manually reconfigured by a service technician.

Figure 15:
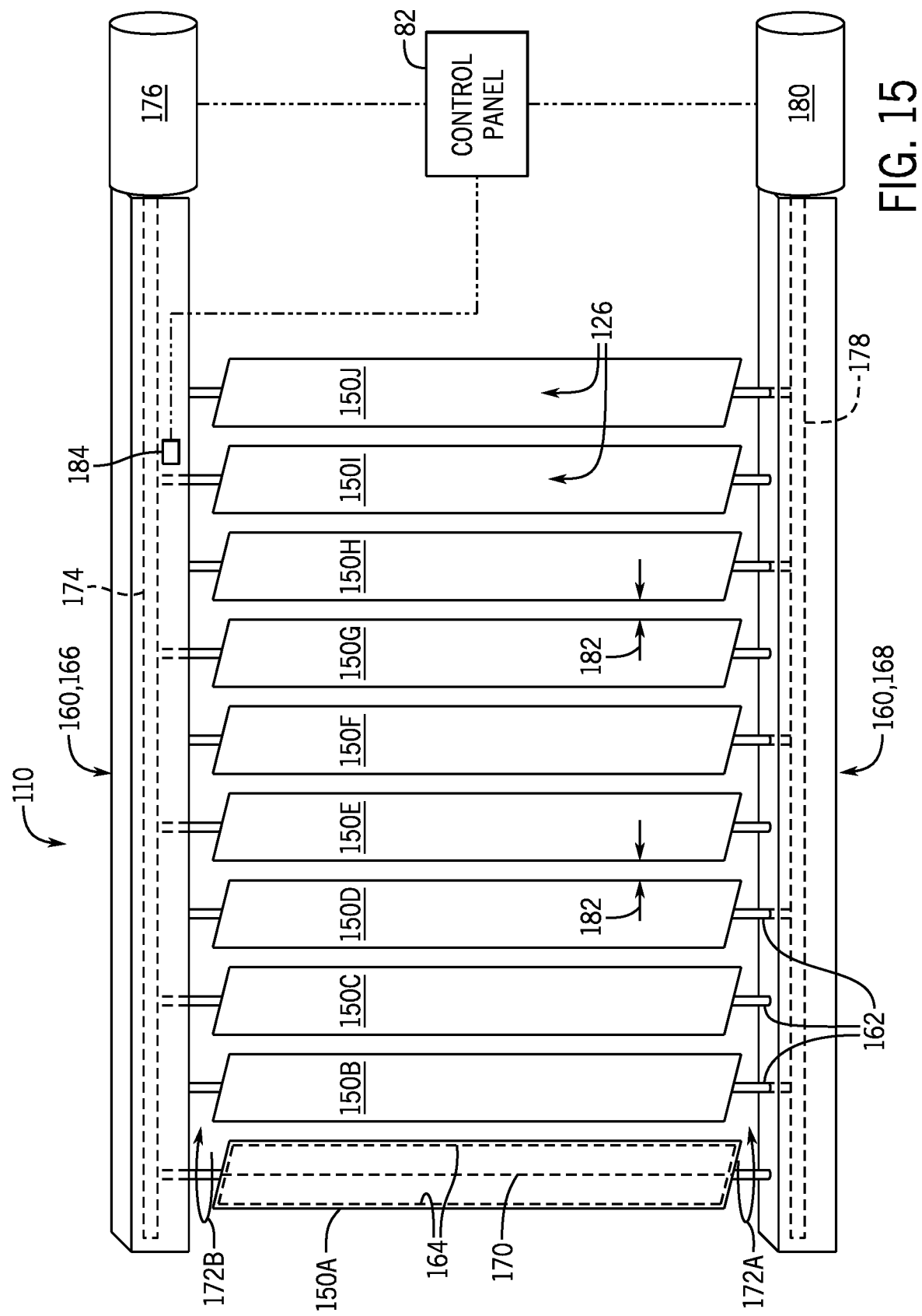
FIG. 15 is a schematic diagram of an embodiment of the filter assembly of FIG. 14 in an open configuration, in accordance with an aspect of the present disclosure.

FIG. 15 is a schematic diagram illustrating an embodiment of the filter assembly 110 illustrated in FIG. 14 in an open configuration. The embodiment of the filter assembly 110 illustrated in FIG. 15 includes a number of filter sections 150, which are referred to as filter slats 150 (e.g., filter slats 150A, 150B, 150C, 150D, 150E, 150F, 150H, 150I, and 150J), each operably coupled to a portion of the support structure 160 via a respective rod 162. For this embodiment, each of the filter slats 150 may be made of a fine filtration material 126 disposed over a rectangular filter frame 164, which may be made of metal or suitable structural material. Additionally, each respective rod 162 is coupled to each respective frame 164 and extends out of the respective filtration material 126 and into corresponding openings in an upper portion 166 of the support structure 160 and a lower portion 168 of the support structure 160. As such, for the illustrated embodiment, the rods 162 secure each of the filter slats 150 to the support structure 160 and define a respective rotational axis 170 of each of the filter slats 150, as indicated by the arrows 172A and 172B. In certain embodiments, the rods 162 may instead each be implemented as two shorter rods that are coupled to and extend from the frame 164 of each of the filter slats 150.

More specifically, for the filter assembly 110 illustrated in FIG. 15, a first set of the filter slats 150A, 150C, 150E, 150G, and 150I, extend deeper into the upper portion 166 of the support structure 160 to operably couple to an upper transfer or transmission rod 174 disposed in the upper portion 166. The upper transfer rod 174 is coupled to an upper motor 176, such that operation of the motor 176 in a first direction causes the first set of filter slats to rotate in a first direction (e.g., as indicated by the arrow 172A), and operation of the motor 176 in a second direction causes the first set of filter slats to rotate in a second direction (e.g., as indicated by the arrow 172B) about their respective rotational axes 170. Similarly, a second set of the filter slats 150B, 150D, 150F, 150H, and 150J, extend deeper into the lower portion 168 of the support structure 160 to operably couple to a lower transfer rod 178 that is disposed in the lower portion 168. The lower transfer rod 178 is coupled to a lower motor 180, such that operation of the motor 180 in a first direction causes the second set of filter slats to rotate in a first direction (e.g., as indicated by the arrow 172A) about their respective rotational axes 170, and operation of the motor 180 in a second direction causes the second set of filter slats to rotate in a second direction (e.g., as indicated by the arrow 172B) about their respective rotational axes 170. It may be appreciated that the transfer rods 174, 178 are merely provided as examples, and in other embodiments, other transfer mechanisms or devices (e.g., drive belts, drive chains, spooled strings) may also be used, in accordance with the present disclosure. For reduced cost and complexity, in certain embodiments, the filter assembly 110 may lack a second transfer rod and second motor, and all of the filter slats 150 may be operably coupled to a single motor by a single transfer device. Additionally, for reduced cost and complexity, in certain embodiments, the first or the second set of filter slats 150 may be affixed in position, while the remaining filter slats 150 are rotated to switch the filter assembly 110 to yield the open and the closed configurations, also resulting in a design that includes fewer components.

Accordingly, for the embodiment of the filter assembly illustrated in FIG. 15, each of the filter slats 150 are rotatable about its respective rotational axis 170, such that the filter assembly 110 is able to move between an open and a closed configuration. Examples of the closed configuration are illustrated in FIG. 14, discussed above, and in FIG. 16, discussed below. The filter assembly 110 illustrated in FIG. 15 is in an open configuration, in which adjacent filter slats are separated from one another by respective gaps 182. As such, it should be appreciated that while the filtration material 126 of the filter slats 150 is itself designed to block fine debris from traversing the air intake 100 of the HVAC unit 12, the illustrated embodiment of the filter assembly 110 in the open configuration may allow some fine debris to traverse the air intake 100 of the HVAC unit 12. That is, in the illustrated open configuration, the gaps 182 between adjacent filter slats 150 of the illustrated filter assembly 110 may be suitably sized (e.g., 1 mm or less) to block coarse debris from traversing the air intake 100 via the gaps 182. While fine debris may still traverse the air intake 100 of the HVAC unit 12 in the open configuration, it is also presently recognized that the open configuration provides a substantially lower pressure drop across the filter assembly 110 than other filter designs that do not include the gaps 182, and this lower pressure drop reduces energy consumption of the fans 32 and the HVAC unit 12. Additionally, in certain embodiments, the filter assembly 110 may include gaps 182 in the open configuration that are substantially larger than coarse debris (e.g., greater than 1 mm) to further reduce or substantially eliminate the pressure drop across the filter assembly during operation. In certain of these embodiments, the filter assembly 110 may further include one or more coarse mesh layers, like the coarse inner mesh 120 and/or the coarse outer mesh 112 discussed above, disposed behind and/or in front of the filter slats 150 to block coarse debris from entering the air intake 100 regardless of the configuration of the filter slats 150.

For the embodiment illustrated in FIG. 15, the upper and lower motors 176, 180 are communicatively coupled to the control panel 82 of the HVAC unit 12, such that the control panel 82 can provide control signals to the motors to move the filter slats 150 of the filter assembly 110 between the open and closed configurations. In certain embodiments, the filter assembly 110 or another suitable component of the HVAC unit 12 may include one or more sensors 184 that are communicatively coupled to the control panel 82 and designed to measure the positions of the filter slats 150. For example, the illustrated filter assembly 110 includes a sensor 184, such as a displacement sensor or an optical sensor, configured to measure a position of the filter slats 150, or a size of the gaps 182 between adjacent filter slats 150, to determine whether the filter assembly 110 has reached the open or closed configuration. By way of specific example, in an embodiment, when the control panel 82 activates the motors 176 and 180 to move the filter slats 150 to the open configuration, the sensor 184 may provide measurement signals to the control panel 82, such that the control panel 82 can determine when the gaps 182 are suitable sized (e.g., about 1 mm, ±10%) to capture coarse debris, and thereby determine that the filter assembly 110 is in the open configuration. In other embodiments, the filter assembly 110 and HVAC unit 12 may lack the sensor 184 and the motors 176, 180 may be stepper motors that have been suitably calibrated such that the control panel 82 provides control signals to cause the motors to perform a predetermined number of steps in a predetermined direction to move the filter slats 150 between the open and closed configurations. In other embodiments, the position of each of the filter slats 150 may be manually set and manually adjusted by a service technician during installation or maintenance of the HVAC unit 12. That is, in certain embodiments, the motors 176, 180 may be manually activated by a service technician via inputs provided to the control panel 82 or via a user input mechanism (e.g., buttons/switches operably coupled to the motors) to achieve a desired open or closed configuration. In still other embodiments, the illustrated filter assembly 110 may lack the motors 176, 180, and may instead be manually positioned by the service technician interacting with the upper and lower transfer rods 174 and 178, or manually rotating the filter slats 150 into suitable positions to achieve the open and closed configurations.

Figure 16:
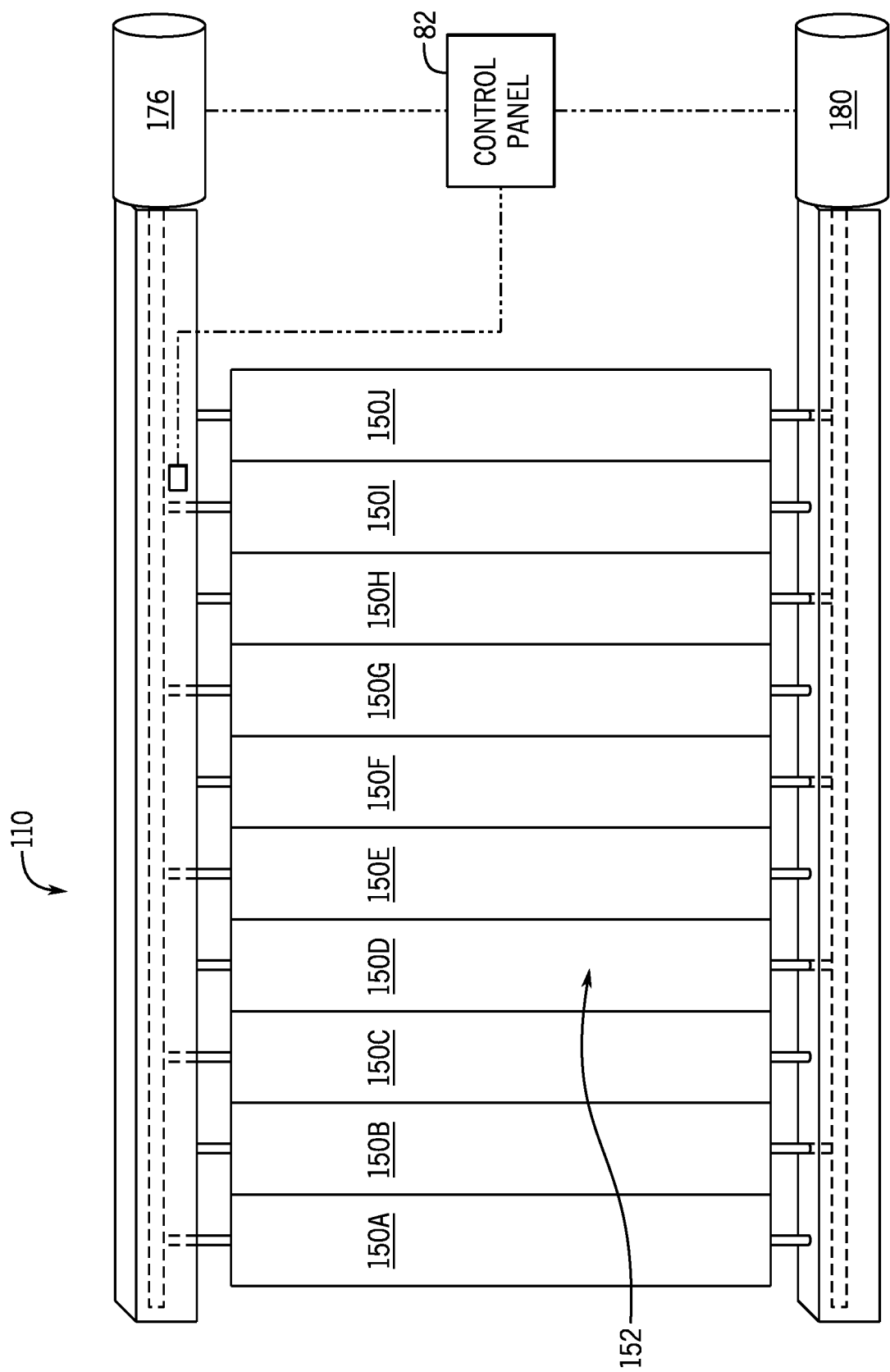
FIG. 16 is a schematic diagram illustrating the embodiment of the filter assembly illustrated in FIG. 15 in a closed configuration, in accordance with an aspect of the present disclosure.

FIG. 16 is a schematic diagram illustrating the embodiment of the filter assembly 110 illustrated in FIG. 15 in a closed configuration. As illustrated, adjacent filter slats 150 of the filter assembly 110 contact one another to form the unified filter surface 152. In certain embodiments, adjacent filter slats 150 may slightly overlap with one another, or edges of the filter slats 150 may align with and contact one another to form a substantially flat unified filter surface 152. As such, during operation of the fans 32 of the HVAC unit 12, the airflow 102 traverses the filtration material 126 of the filter slats 150, and the unified filter surface 152 of the filter assembly 110 blocks both fine and coarse debris from traversing the air intake 100 of the HVAC unit 12. However, it is also noted that, since the closed configuration lacks the gaps 182 illustrated in FIG. 15, the pressure drop across the filter assembly 110 is generally higher when the filter assembly 110 is in the closed configuration relative to the open configuration.

Figure 17:
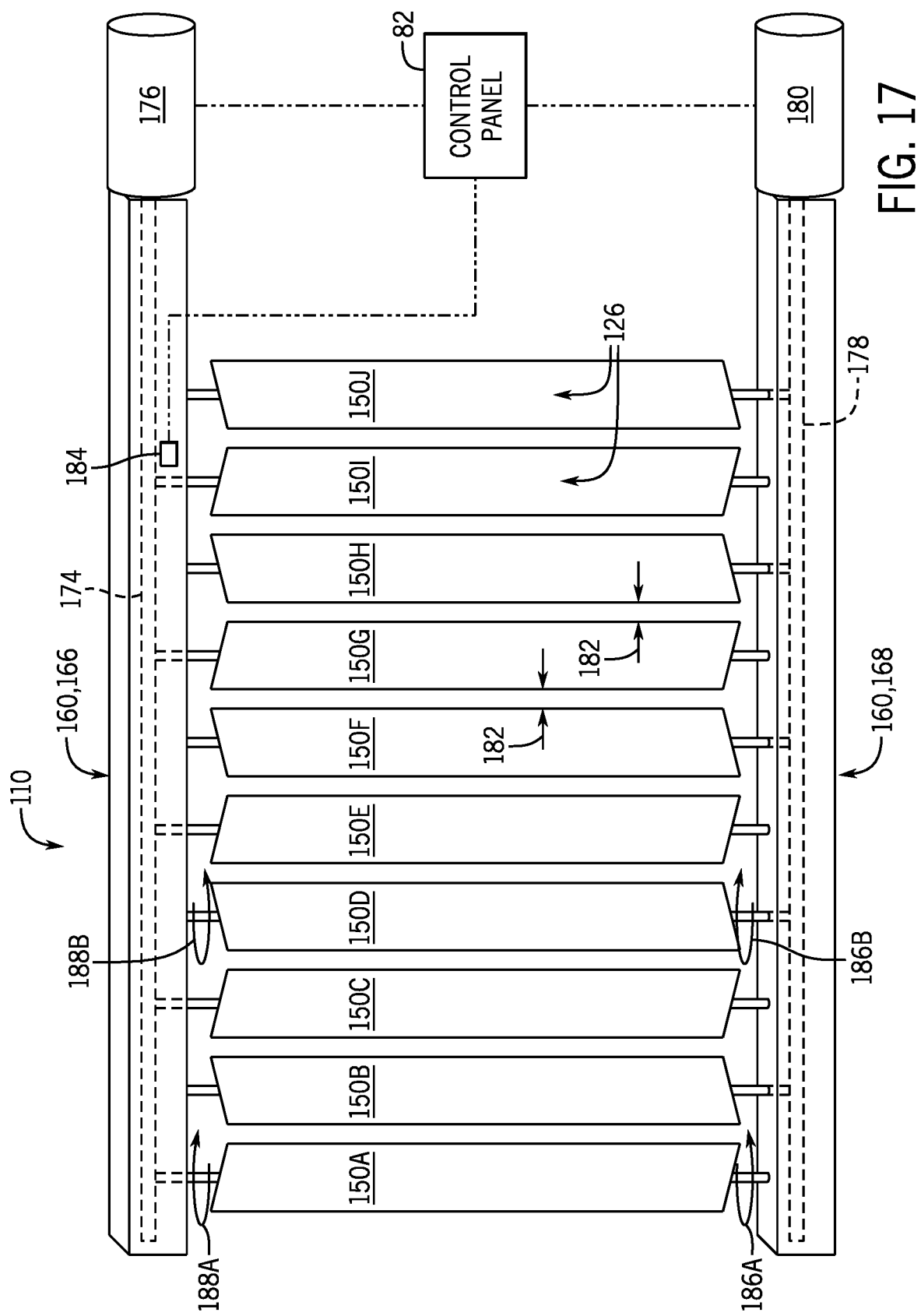
FIG. 17 is a schematic diagram illustrating another embodiment of the filter assembly illustrated in FIG. 15 in an open configuration, in accordance with an aspect of the present disclosure.

FIG. 17 is a schematic diagram illustrating another embodiment of the filter assembly 110 illustrated in FIG. 15. The embodiment of the filter assembly 110 illustrated in FIG. 16 includes a number of filter slats 150 (e.g., filter slats 150A-J), each operably coupled to the support structure 160, as discussed above. However, for this embodiment, when moving between the illustrated open configuration and the closed configuration, adjacent filter slats 150 rotate in opposite directions. For the illustrated example, when moving from the open to the closed configuration, the first set of filter slats 150A, 150C, 150E, 150G, and 150I rotate in a first direction indicated by the arrow 186A and the second set of filter slats 150B, 150D, 150F, 150H, and 150J rotate in a second direction indicated by the arrow 186B. When moving from the closed to the open configuration, the first set of filter slats 150A, 150C, 150E, 150G, and 150I rotate in a first direction indicated by the arrow 188A and the second set of filter slats 150B, 150D, 150F, 150H, and 150J rotate in a second direction indicated by the arrow 188B.

FIG. 18 is a schematic diagram illustrating the embodiment of the filter assembly 110 of FIG. 17 in a closed configuration. As illustrated, adjacent filter slats 150 of the filter assembly 110 contact one another to form a unified filter surface 152. It may be noted that, while the unified filter surface 150 may not be perfectly continuous and may include minor spaces at the interfaces between the filter slats 150, it may be described herein as "continuous" because the overlap and/or engagement of adjacent filter slats 150 creates a connected or unified surface with respect to the airflow 102. As such, during operation of the fans 32 of the HVAC unit 12, the airflow 102 is traverses the filtration material 126 of the filter slats 150, and the unified filter surface 152 of the filter assembly 110 blocks both fine and coarse debris from traversing the air intake 100 of the HVAC unit 12. It is also noted that the unified filter surface 152 of the illustrated embodiment includes triangular valleys 136 that extend or protrude in the direction of the airflow 102, giving the unified filter surface 152 a zig-zag or accordion-like profile similar to the embodiment of FIG. 8. As with the embodiments of the filter assembly 110 discussed above with respect to FIGS. 5-13, the filtration material 126 in the triangular valleys 136 of the filter assembly 110 illustrated in FIG. 18 accumulate coarse and fine debris while other portions of the filtration material 126 remain unobstructed, reducing the pressure drop across the filter assembly 110.

FIG. 19 is a schematic diagram illustrating another embodiment of the filter assembly 110 illustrated in FIGS. 17 and 18 in a closed configuration. Like the embodiments of the filter assembly 110 discussed above with respect to FIGS. 17 and 18, the embodiment of the filter assembly 110 illustrated in FIG. 19 includes filter slats 150 that are designed to move between an open configuration that includes gaps between the filter slats 150 and the illustrated closed configuration, in which the filter slats 150 contact one another to form a unified filter surface 152 as a result of the overlap and engagement of the filter slats 150. The embodiment of the filter assembly 110 illustrated in FIG. 19 includes a first and a second motor 190 and 192 that are operably coupled to upper spools 194 and lower spools 196 and communicatively coupled to the control panel 82 of the HVAC unit 12. An upper transfer belt 198 is loaded onto the upper spools 194, and a lower transfer belt 200 is loaded onto the lower spools 196, and the transfer belts 198 and 200 pass through corresponding slots 202 in the filter slats 150. Additionally, a first set of filter slats, 150A, 150C, 150E, 150G, 150I, and 150K, is coupled to the upper transfer belt 198 and rotates in a first direction, as indicated by the arrow 204A, in response to movement of the upper transfer belt 198 to switch the filter assembly 110 to the illustrated closed configuration. A second set of filter slats, 150B, 150D, 150F, 150H, and 150I, is coupled to the lower transfer belt 200 and rotates in response to movement of the lower transfer belt 200, as indicated by the arrow 204B, to switch the filter assembly 110 to the illustrated closed configuration. Like the filter assembly 110 of FIG. 18, the unified filter surface 152 of the illustrated embodiment includes triangular valleys 136 that extend or protrude in the direction of the airflow 102, giving the unified filter surface 152 a zig-zag or accordion-like profile.

With the foregoing in mind, in certain embodiments of the filter assembly 110 that include filter slats 150, the control panel 82 may provide control signals to move the filter slats 150 between the open configuration and the closed configuration (including intermediate configurations) in response to one or more conditions of the HVAC unit 12 and/or the outdoor environment. For example, in certain embodiments, the control panel 82 provides control signals to put the filter assembly 110 in the open configuration by default or an intermediate configuration based on a determination of material size to be filtered, which may be based on location and/or weather. It may be appreciated that the open configuration of the filter assembly 110 minimizes the pressure drop across the filter assembly 110, which reduces power consumption of the fans 32 and the HVAC unit 12. Additionally, in certain embodiments, the open configuration may include gaps 182 suitably sized (e.g., 1 mm or more) to block coarse debris from traversing the air intake 100. However, during operation of the HVAC unit 12, when the control panel 82 determines that the current operating time falls with a predetermined time window when debris is known to increases in the outdoor environment (e.g., pollen season, dust storm season, morning, evening), then the control panel 82 may provide suitable control signals to switch the filter assembly 110 to the closed configuration, which blocks the coarse and fine debris from reaching the heat exchanger 28 within the HVAC unit 12. For such embodiments, the control panel 82 may be programmed (e.g., during installation or maintenance) to define the predetermined time windows when the fine debris is known to increase, and may also include a clock that tracks the passage of time. In other embodiments, the control panel 82 may be communicatively coupled to an external service, such as an online weather or air-quality service that provides information regarding outdoor debris in the air, and the control panel 82 may determine when to switch the filter assembly 110 to the closed configuration based on information received from the external service.

In another example, the control panel 82 of the HVAC unit 12 provides control signals to place the filter assembly 110 in the closed configuration by default in order to block both coarse and fine debris from traversing the air intake 100. Additionally, the control panel 82 may receive measurements from the pressure sensor 116 and monitor the pressure drop across the filter assembly 110 over time. As coarse and fine debris accumulates within the filter slats 150 over time, the pressure drop across the filter assembly 110 increases. Once the pressure drop across the filter assembly 110 reaches a predefined pressure threshold value, the control panel 82 may provide control signals to switch the filter assembly 110 to the open configuration to reduce the pressure drop across the filter assembly 110, which reduces power consumption of the fans 32 and the HVAC unit 12. Additionally, in certain embodiments, the open configuration may include gaps 182 suitably sized (e.g., 1 mm or more) to block coarse debris from traversing the air intake 100. In certain embodiments, the filter slats 150 of the filter assembly 110 are moved toward the open configuration until a predefined target pressure drop value is measured across the filter assembly. Additionally, in certain embodiments, the control panel 82 may activate the water spray jets 118 of the HVAC unit 12 to wash debris from the filtration material 126 of the filter slats 150 before switching the filter assembly 110 to the open configuration. For such embodiments, performing this washing step before rotating the filter slats 150 into the open configuration helps to prevent debris that has previously collected on the filter slats 150 from traversing the air intake 100 and reaching the heat exchanger 28. In still other embodiments, the control panel 82 may first activate the water spray jets 118 while the filter assembly 110 is in the closed configuration, and, once the filter assembly is dry, determine if the pressure drop has decreased below the pressure threshold value before resorting to switching the filter assembly 110 into the open position. Additionally, when the control panel 82 determines that the pressure drop is still above the predetermined threshold after washing and/or attempting to switch to the open configuration, the control panel 82 may provide an indication that maintenance of the HVAC unit 12 should be performed.

The technical effects of the present disclosure include providing improved filter assemblies for filtering outdoor airflows that limit the pressure drop across the filter assembly. More specifically, present embodiments include filter assemblies that are designed to be disposed upstream of a microchannel heat exchanger of the HVAC system to capture debris and prevent it from depositing onto a surface of the heat exchanger. In certain embodiments, the disclosed filter assembly includes an inner and an outer coarse filter with a fine filter removably loaded therebetween. For such embodiments, the fine filter includes features, such as valleys or extensions, that protrude in the direction of air flow and that accumulate captured debris while still enabling suitable airflow, and limited pressure drop, across the filter assembly. In other embodiments, the filter assembly includes a set of movable filter sections, which can be selectively positioned and moved between an open configuration and a closed configuration that blocks both coarse and fine debris. Further, by adjusting the positions of the filter sections to provide a minimum amount of filtration that is suitable for a given environment and time, such embodiments minimize the pressure drop associated with the filter assembly, improving the efficiency and the operation of the HVAC system.

The invention claimed is:

1. A heating, ventilation, and/or air conditioning (HVAC) unit, comprising:
a cabinet configured to house a heat exchanger therein, wherein the cabinet comprises:
an outdoor air intake configured to receive an outdoor airflow drawn into the cabinet and directed across the heat exchanger; and
an exhaust outlet configured to discharge the outdoor airflow from the cabinet directly to an outdoor environment;
a control panel;
a water spray jet communicatively coupled to the control panel;
a pressure sensor communicatively coupled to the control panel and configured to measure a pressure of the outdoor airflow; and
a filter assembly of the outdoor air intake, wherein the filter assembly is configured to filter the outdoor airflow received by the cabinet via the outdoor air intake, and wherein the filter assembly comprises:
a support structure; and
a plurality of filter slats, each comprising a filtration material, each disposed within the support structure, and wherein the plurality of filter slats is configured in a louvered relationship and configured to be actuated between a stationary closed configuration through which the outdoor airflow passes and a stationary open configuration through which the outdoor airflow passes, wherein each filter slat of the plurality of filter slats is obliquely angled relative to a direction of the outdoor airflow in the stationary closed configuration and in the stationary open configuration, wherein, in the stationary open configuration, the filter assembly comprises gaps between adjacent filter slats of the plurality of filter slats through which the outdoor airflow passes, and wherein the plurality of filter slats is configured to capture debris and block the debris from passing through the gaps in the stationary open configuration,
wherein the control panel is configured to transmit a signal to activate the water spray jet in response to a determination that a pressure drop across the filter assembly exceeds a predetermined pressure threshold value.

2. The HVAC unit of claim 1, wherein the stationary closed configuration comprises contact between the adjacent filter slats to form a unified filter surface through which the outdoor airflow passes.

3. The HVAC unit of claim 2, wherein the unified filter surface of the stationary closed configuration is configured to capture the debris from the outdoor airflow with the filtration material.

4. The HVAC unit of claim 1, comprising a first motor operably coupled to a first portion of the plurality of filter slats, wherein the first motor is configured to rotate the first portion of the plurality of filter slats from the stationary open configuration to the stationary closed configuration in a first direction, and to rotate the first portion of the plurality of filter slats from the stationary closed configuration to the stationary open configuration in a second direction opposite the first direction.

5. The HVAC unit of claim 4, comprising a second motor operably coupled to a second portion of the plurality of filter slats, wherein the second motor is configured to actuate the second portion of the plurality of filter slats from the stationary open configuration to the stationary closed configuration in the second direction, and to rotate the second portion of the plurality of filter slats from the stationary closed configuration to the stationary open configuration in the first direction.

6. The HVAC unit of claim 1, comprising the heat exchanger disposed within the cabinet, wherein the heat exchanger is a microchannel heat exchanger.

7. A rooftop unit of a heating, ventilation, and/or air conditioning (HVAC) system, comprising:
a cabinet comprising an outdoor air intake configured to direct an outdoor airflow into the cabinet from an outdoor environment and an exhaust outlet configured to discharge the outdoor airflow from the cabinet directly to the outdoor environment;
a heat exchanger disposed within the cabinet, wherein the heat exchanger is configured to place the outdoor airflow in a heat exchange relationship with a refrigerant directed through the heat exchanger;
a fan positioned downstream of the outdoor air intake relative to a flow of the outdoor airflow through the cabinet, wherein the fan is configured to draw the outdoor airflow into the cabinet via the outdoor air intake and discharge the outdoor airflow from the cabinet via the exhaust outlet;
a control panel;
a water spray jet communicatively coupled to the control panel;
a pressure sensor communicatively coupled to the control panel and configured to measure a pressure of the outdoor airflow; and
a filter assembly configured to selectively filter debris from the outdoor airflow directed through the outdoor air intake and into the cabinet, the filter assembly comprising:
a motor;
a transfer device operably coupled to the motor; and
a plurality of filter slats in a louvered relationship, each comprising a filtration material, each operably coupled to the motor via the transfer device, and configured to be selectively actuated between a stationary closed configuration and a stationary open configuration, wherein each filter slat of the plurality of filter slats is obliquely angled relative to a direction of the outdoor airflow through the filter assembly in the stationary closed configuration and in the stationary open configuration;
wherein the control panel is configured to transmit a signal to activate the water spray jet in response to a determination that a pressure drop across the filter assembly exceeds a predetermined pressure threshold value.

8. The rooftop unit of claim 7, wherein the stationary open configuration positions the plurality of filter slats to filter the debris from the outdoor airflow in gaps between adjacent filter slats, and wherein the gaps are 1 millimeter (mm) wide or more.

9. The rooftop unit of claim 7, wherein the stationary open configuration positions the plurality of filter slats to filter the debris from the outdoor airflow via gaps between adjacent filter slats, wherein the gaps are larger than 1 mm wide, and wherein the plurality of filter slats reduces the pressure drop across the filter assembly in the stationary open configuration.

10. The rooftop unit of claim 7, wherein the stationary closed configuration positions the plurality of filter slats such that adjacent filter slats contact one another to form a unified filter surface to filter the debris from the outdoor airflow with the filtration material.

11. The rooftop unit of claim 10, wherein the unified filter surface includes valleys that extend in the direction of the outdoor airflow and are configured to accumulate the debris from the outdoor airflow.

12. The rooftop unit of claim 11, wherein the valleys comprise triangular valleys formed where the adjacent filter slats contact one another in the stationary closed configuration.

13. The rooftop unit of claim 7, wherein the plurality of filter slats comprises a first set of filter slats configured to be rotated in a first direction via the motor to yield the stationary open configuration and configured to be rotated in a second direction via the motor to yield the stationary closed configuration.

14. The rooftop unit of claim 13, wherein the motor is a first motor, the filter assembly comprises a second motor, the plurality of filter slats comprises a second set of filter slats configured to be rotated in the second direction via the second motor to yield the stationary open configuration and configured to be rotated in the first direction via the second motor to yield the stationary closed configuration.

15. The rooftop unit of claim 7, wherein the heat exchanger is a microchannel heat exchanger.

16. A heating, ventilation, and/or air conditioning (HVAC) unit, comprising:
a control panel configured to control operation of the HVAC unit;
a cabinet, comprising:
an outdoor air intake configured to direct an outdoor airflow from an outdoor environment into the cabinet; and
an exhaust outlet configured to discharge the outdoor airflow from the cabinet directly to the outdoor environment;
a water spray jet communicatively coupled to the control panel;
a filter assembly configured to filter debris from the outdoor airflow entering the outdoor air intake of the HVAC unit to exchange heat with a heat exchanger of the HVAC unit, wherein the filter assembly comprises:
a motor communicatively coupled to the control panel;
a transfer device operably coupled to the motor; and
a plurality of filter slats, each comprising a filtration material, each operably coupled to the transfer device in a louvered relationship, and configured to be actuated between a stationary closed configuration and a stationary open configuration, wherein each filter slat of the plurality of filter slats is obliquely angled relative to a direction of the outdoor airflow in the stationary closed configuration and in the stationary open configuration; and
a pressure sensor communicatively coupled to the control panel and configured to collect data indicative of a measured pressure drop across the filter assembly, wherein the control panel is configured to provide control signals to actuate the plurality of filter slats between the stationary closed configuration and the stationary open configuration based on the measured pressure drop, and wherein the control panel is configured to provide an additional control signal to activate the water spray jet in response to a determination that the measured pressure drop across the filter assembly exceeds a predetermined pressure threshold value.

17. The HVAC unit of claim 16, wherein the control panel is configured to provide the control signals to actuate the plurality of filter slats from the stationary closed configuration to the stationary open configuration in response to determining that the measured pressure drop across the filter assembly exceeds the predetermined pressure threshold value.

18. The HVAC unit of claim 16, wherein the control panel is configured to provide the control signals to actuate the plurality of filter slats from the stationary closed configuration to the stationary open configuration until the measured pressure drop across the filter assembly reaches a target predetermined pressure threshold value.

19. The HVAC unit of claim 18, wherein the water spray jet is disposed near the filter assembly, and wherein the control panel is configured to activate the water spray jet to wash at least a portion of the debris from the plurality of filter slats before providing the control signals to actuate the plurality of filter slats to the stationary open configuration.

20. The HVAC unit of claim 16, wherein the control panel comprises a clock and a memory configured to store at least one predetermined time period in which the debris is expected to increase in the outdoor airflow, wherein the control panel is configured to provide the control signals to actuate the plurality of filter slats from the stationary open configuration to the stationary closed configuration in response to determining a current time indicated by the clock falls within the at least one predetermined time period.

21. The HVAC unit of claim 16, comprising
at least one temperature sensor communicatively coupled to the control panel and configured to measure a temperature of the outdoor airflow, wherein the control panel is configured to provide the additional control signal to activate the water spray jet to cool the outdoor airflow in response to determining that the measured temperature of the outdoor airflow is greater than a predetermined temperature threshold value.

22. The HVAC unit of claim 16, comprising the heat exchanger, wherein the heat exchanger is disposed within the cabinet, and the heat exchanger is a microchannel heat exchanger.

* * * * *